(12) United States Patent
Nagami et al.

(10) Patent No.: US 7,917,533 B2
(45) Date of Patent: Mar. 29, 2011

(54) MASTER MANAGEMENT SYSTEM, MASTER MANAGEMENT METHOD, AND MASTER MANAGEMENT PROGRAM

(75) Inventors: Akihisa Nagami, Yokohama (JP); Shinji Kimura, Sagamihara (JP); Masayuki Tosaka, Ebina (JP); Fumio Noda, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 210 days.

(21) Appl. No.: 12/403,758

(22) Filed: Mar. 13, 2009

(65) Prior Publication Data

US 2009/0265361 A1 Oct. 22, 2009

(30) Foreign Application Priority Data

Apr. 17, 2008 (JP) ................ 2008-108142

(51) Int. Cl.
 *G06F 17/30* (2006.01)
(52) U.S. Cl. ........... 707/785; 709/224; 709/227; 705/35
(58) Field of Classification Search ............ 70/617; 707/782, 781, 783, 785, 721, 723, 999.003, 707/999.201, 3, 201; 709/224, 227; 705/35
See application file for complete search history.

(56) References Cited

U.S. PATENT DOCUMENTS

| | | | | |
|---|---|---|---|---|
| 5,452,294 | A * | 9/1995 | Natarajan ............. | 370/351 |
| 7,702,767 | B2 * | 4/2010 | Connolly et al. ....... | 709/223 |
| 7,734,778 | B2 * | 6/2010 | Tsao ................ | 709/225 |
| 2003/0061323 | A1 * | 3/2003 | East et al. ........... | 709/223 |
| 2003/0225644 | A1 * | 12/2003 | Casati et al. .......... | 705/35 |
| 2004/0181476 | A1 * | 9/2004 | Smith et al. .......... | 705/35 |
| 2004/0228304 | A1 * | 11/2004 | Riedel et al. ......... | 370/332 |
| 2005/0160251 | A1 * | 7/2005 | Zur et al. ............ | 712/1 |
| 2006/0080385 | A1 * | 4/2006 | Blandford et al. ...... | 709/203 |
| 2007/0022197 | A1 * | 1/2007 | Logvinov et al. ....... | 709/226 |
| 2007/0179955 | A1 * | 8/2007 | Croft et al. .......... | 707/9 |
| 2008/0155647 | A1 * | 6/2008 | Miyawaki et al. ....... | 726/1 |
| 2008/0201455 | A1 * | 8/2008 | Husain ............... | 709/220 |

(Continued)

FOREIGN PATENT DOCUMENTS

JP 2004-110791 4/2004

(Continued)

OTHER PUBLICATIONS

Daniel Walton, The Simulation of Dynamic Resource Brokering in a Grid Environment, Nov. 2002, 1-72.*

(Continued)

*Primary Examiner* — Robert Timblin
*Assistant Examiner* — Sherief Badawi
(74) *Attorney, Agent, or Firm* — McDermott Will & Emery LLP

(57) ABSTRACT

A master management system includes a duty master creating part that counts the number of users in each group of same-attribute users who desire to use each of the applications, that identifies the applications each of which the number of users desiring to use is equal to or larger than a predetermined number, that creates and stores a master in a master management database of a storage device; and an individual setting part that identifies virtualization-possible applications of the applications each of which the number of users desiring to use is equal to or smaller than the predetermined number, and that sets data on users desiring to use the virtualization-possible applications in the distribution destination list of a distributing server.

11 Claims, 14 Drawing Sheets

U.S. PATENT DOCUMENTS

| | | | |
|---|---|---|---|
| 2008/0201479 A1* | 8/2008 | Husain et al. | 709/227 |
| 2008/0201711 A1* | 8/2008 | Amir Husain | 718/1 |
| 2009/0019538 A1* | 1/2009 | Pandya | 726/13 |
| 2009/0070404 A1* | 3/2009 | Mazzaferri | 709/202 |
| 2009/0070687 A1* | 3/2009 | Mazzaferri | 715/751 |
| 2009/0094365 A1* | 4/2009 | Orady et al. | 709/226 |
| 2009/0106571 A1* | 4/2009 | Low et al. | 713/310 |
| 2009/0300381 A1* | 12/2009 | Chen et al. | 713/310 |
| 2009/0327908 A1* | 12/2009 | Hayton | 715/744 |
| 2010/0082734 A1* | 4/2010 | Elcock | 709/203 |
| 2010/0107113 A1* | 4/2010 | Innes et al. | 715/779 |
| 2010/0138528 A1* | 6/2010 | Frank | 709/224 |
| 2010/0138780 A1* | 6/2010 | Marano et al. | 715/804 |
| 2010/0138828 A1* | 6/2010 | Hanquez et al. | 718/1 |
| 2010/0146585 A1* | 6/2010 | Li et al. | 726/1 |

FOREIGN PATENT DOCUMENTS

| | | |
|---|---|---|
| JP | 2008-090493 | 4/2008 |
| JP | 2008-090494 | 4/2008 |

OTHER PUBLICATIONS

HP, The tool for brokering connections between users and their virtualized client resources, May 2010, HP, 1-4.*

Leostream, Leostream Connection Broker Where Virtual Desktops Meet Real Business, Jul. 2009, 1-2.*

Leorstream, Leostream Connection Broker, Jul. 2009, 1-2.*

* cited by examiner

PORTABLE STORING MEDIUM 50

PC ENVIRONMENT MANAGING DB — 125

| USER ID | NAME OF COMPUTER | CPU INFORMATION | AMOUNT OF MEMORY | SIZE AND RESOLUTION OF DISPLAY | NAME OF APPLICATION | NAME OF APPLICATION CURRENTLY USED | LOGON/ LOGOFF TIME | CPU LOAD /AMOUNT OF MEMORY USED |
|---|---|---|---|---|---|---|---|---|
| user01 | abcd··· | 1GHz ··· | 512 MB | 1024×··· | A(ver.1) ··· | A(ver.1) ··· | 09:00/20:00 | LOAD LEVEL A-15MB USED |
| ... | ... | ... | ... | ... | ... | ... | ... | ... |

FIG. 6A

APPLICATION ATTRIBUTE MANAGING DB — 126

| NAME OF APPLICATION | VERSION | LICENSE COST | SUPPORTING OS | TS USABLE | STREAMING POSSIBLE | NECESSARY CPU PERFORMANCE | AMOUNT OF MEMORY OCCUPIED | RECOMMENDED AMOUNT OF MEMORY | FILE SIZE | NECESSARY HDD |
|---|---|---|---|---|---|---|---|---|---|---|
| A | 1.0 | 10,000 | XP | YES | YES | 500MHz | 5MB | 512MB | 2MB | 10MB |
|   | 2.0 | 15,000 | XP, Vista | YES | YES | 1GHz | 10MB | 512MB | 4MB | 30MB |
| B | 1.0 | 3,000 | XP, Vista, Server2003 | YES | YES | 300MHz | 10MB | 512MB | 1MB | 50MB |
|   | 2.0 | 4,000 | XP, Vista, Server2003 | YES | YES | 500MHz | 20MB | 512MB | 3MB | 60MB |
|   | 3.0 | 5,000 | XP, Vista, Server2003 | YES | YES | 700MHz | 20MB | 512MB | 5MB | 100MB |
| C | 1.0 | 50,000 | XP, Vista, Server2003 | YES | YES | 500MHz | 10MB | 256MB | 1MB | 30MB |
|   | 1.5 | 60,000 | XP, Vista, Server2003 | YES | YES | 700MHz | 10MB | 512MB | 1.1MB | 50MB |
| D | 1.0 | 8,000 | XP, Vista, Server2003 | YES | YES | 1GHz | 5MB | 512MB | 2MB | 30MB |
|   | 2.0 | 9,000 | XP, Vista, Server2003 | YES | YES | 1GHz | 10MB | 512MB | 5MB | 50MB |
| E | 2.0 | 4,000 | XP, Vista, Server2003 | YES | YES | 500MHz | 20MB | 512MB | 3MB | 50MB |
|   | 3.0 | 5,000 | XP, Vista, Server2003 | YES | YES | 600MHz | 20MB | 1GB | 35MB | 50MB |
| F | 1.0 | 10,000 | XP, Vista, Server2003 | YES | YES | 1GHz | 15MB | 512MB | 500KB | 10MB |
| G | 1.0 | 3,000 | XP, Vista, Server2003 | YES | YES | 500MHz | 10MB | 512MB | 100KB | 5MB |
| H | 1.0 | 5,000 | XP, Vista, Server2003 | YES | NO | 1.5GHz | 5MB | 512MB | 1MB | 10MB |
|   | 2.0 | 6,000 | XP, Vista, Server2003 | YES | NO | 1.5GHz | 10MB | 1GB | 1.5MB | 5MB |
| I | 1.0 | 0 | XP, Vista, Server2003 | YES | YES | 1.5GHz | 10MB | 512MB | 2MB | 10MB |
|   | 2.0 | 0 | XP, Vista, Server2003 | YES | YES | 1.5GHz | 20MB | 1GB | 4MB | 10MB |
| J | 1.0 | 3,000 | XP, Vista, Server2003 | YES | YES | 1.5GHz | 10MB | 1GB | 3MB | 20MB |
|   | 2.0 | 4,000 | XP, Vista, Server2003 | YES | YES | 2.0GHz | 10MB | 1GB | 4MB | 20MB |
|   | 2.5 | 6,000 | XP, Vista, Server2003 | YES | YES | 2.0GHz | 100MB | 1GB | 5MB | 20MB |
| K | 1.0 | 100,000 | XP, Vista | YES | YES | 2.0GHz | 100MB | 1GB | 10MB | 300MB |
| L | 1.0 | 0 | XP, Vista, Server2003 | NO | NO | 500MHz | 10MB | 512MB | 1MB | 20MB |
|   | 2.0 | 0 | XP, Vista, Server2003 | NO | NO | 500MHz | 10MB | 512MB | 3MB | 20MB |

DEPLOYMENT MANAGING DB (127)

| BLADE SERVER ID | MODEL | CPU INFORMATION | AMOUNT OF MEMORY | IP ADDRESS | HARDWARE-DEPENDENT MASTER | DUTY MASTER | USER ID |
|---|---|---|---|---|---|---|---|
| 0123··· | type A | 1GHz ··· | 512 MB | 206.··· | hmast1.dat | amast1.dat | user01 |
| ⋮ | ⋮ | ⋮ | ⋮ | ⋮ | ⋮ | ⋮ | ⋮ |

FIG. 7B

MASTER MANAGING DB (128)

| DUTY ID | DUTY MASTER | HARDWARE-DEPENDENT MASTER |
|---|---|---|
| DUTY "A" | amast1.dat | hmast1.dat |
| ⋮ | ⋮ | ⋮ |

DISTRIBUTION DESTINATION LIST 525

| USER ID | DUTY ID | THIN CLIENT ID | BLADE SERVER ID | IP ADDRESS | ... |
|---|---|---|---|---|---|
| user 01 | DUTY "A" | 3456··· | 0123··· | 206.··· | ... |
| ... | ... | ... | ... | ... | ... |

FIG. 8A

APPLICATION DB 526

| APPLICATION ID | FILE | ... |
|---|---|---|
| DUTY "A" | apl-A01.dat | ... |
| ... | ... | ... |

FIG. 8B

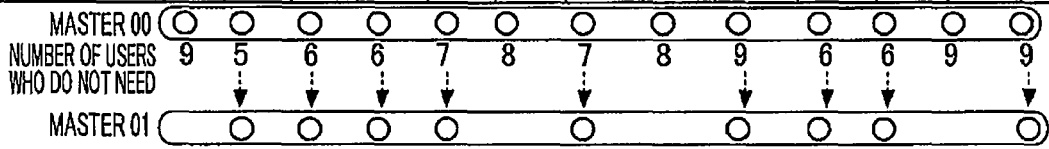
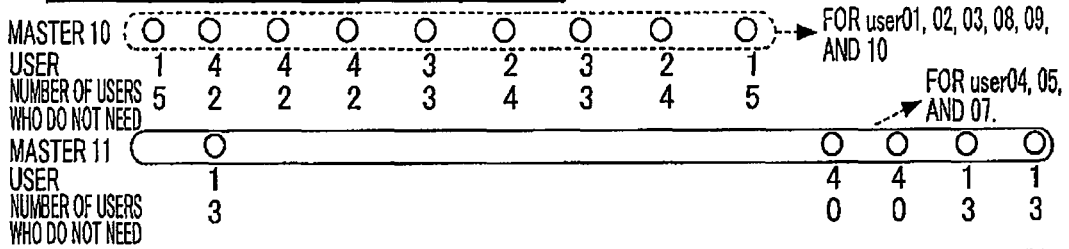
FIG. 13

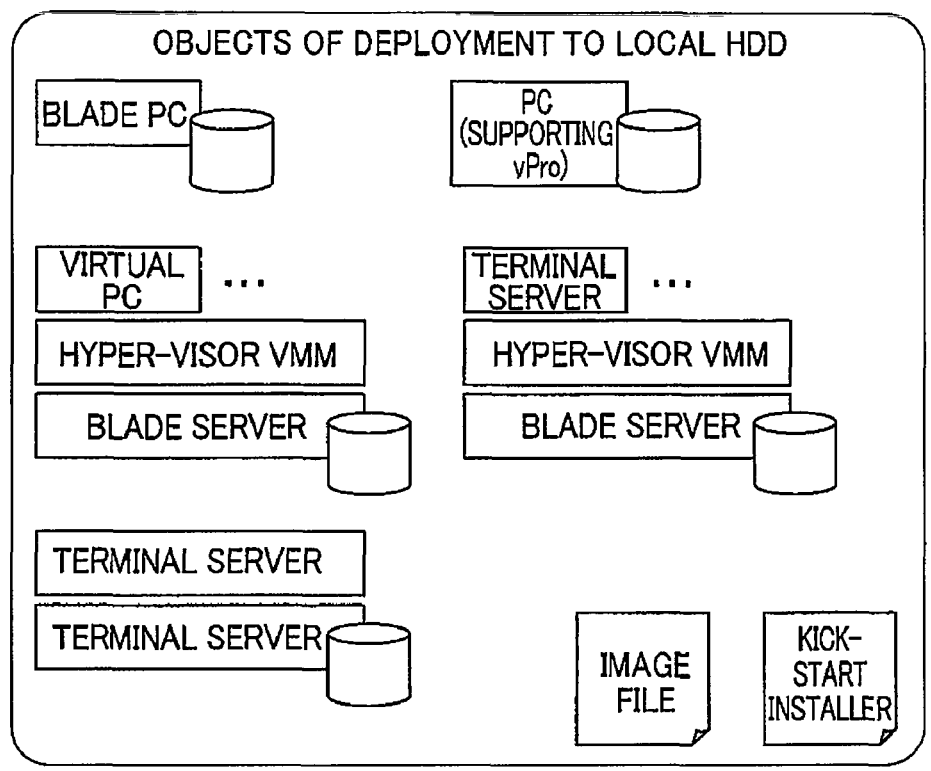
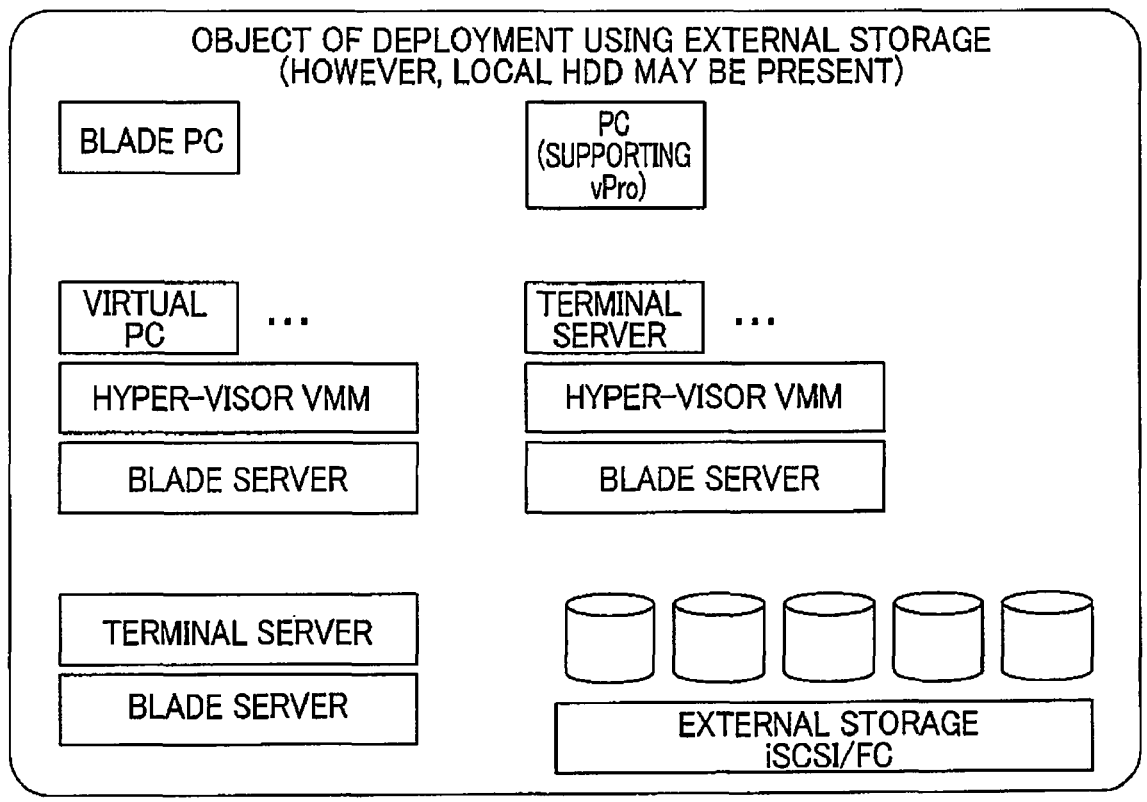
FIG. 14

MASTER MANAGEMENT SYSTEM, MASTER MANAGEMENT METHOD, AND MASTER MANAGEMENT PROGRAM

CROSS-REFERENCE TO RELATED APPLICATIONS

The present application claims a priority from Japanese Patent Application No. 2008-108142 filed on Apr. 17, 2008, the content of which herein incorporated by reference.

BACKGROUND

The present invention relates to a master management system, a master management method, and a master management program, and more specifically to a technique of concurrently establishing both securing of an application use environment desired by a user and effective management of an application deploying master in a thin client system.

Due to the need for information leakage measures and internal control in a company, etc., a concept of "thin client" has appeared, according to which: a dedicated computer (a thin client) omitting therefrom a hard disk apparatus, etc., and having therein only the essential functions such as displaying and inputting is employed for a client computer; and resources such as application software are collectively managed by a server (a blade server).

A proposed technique concerning such a thin client system is, for example, a method of automatically allocating computing resources of a rack blade computer assembly with the object of automatically allocating the computing resources of the rack blade computer assembly, and this method includes the steps of: receiving server performance information from an application server pool disposed on a rack of the rack blade computer assembly; establishing at least one QoS attribute to the application server pool; establishing that the QoS attribute is lower than a standard; and allocating a blade server from a free server pool to be used by the application server pool (see Japanese Patent Application Laid-Open Publication No. 2004-110791).

In a center that provides a virtual desktop computer to a thin client (a party that manages a blade server, etc.), an application needed by a user of the thin client for his/her duties has been grasped and managed based on a register managed offline, a request issued when necessary from the user, etc., and the environment has been set such that the application are usable on the virtual desktop computer. When another type of hardware (such as a blade server with a different specification) was present being mixed in a thin client system: a master that has set therein applications necessary for duties for each type of hardware (for example, an image file of the computer installed with an OS and the applications) has been managed and, based on this master, deployment of the applications is executed on a blade server for the user.

However, because necessary applications and hardware performances often differ for each user and each duty, the number of masters necessary becomes equal to the number of users when all of applications desired by the users are to be provided in a virtual desktop environment to satisfy the demands of all the users. When such master management is executed in a large-scale system that holds a huge number of users, increases of the cost and the labor for the management and an increase of the disk space for storing masters are serious problems.

On the other hand, if multiple users are made to use the same fixed masters for each duty, each hardware, and each position in order to reduce the number of masters, some of the users may be provided with only some of the applications that the user desires to use in the virtual desktop environment and, therefore, it is worried that an obstacle to execution of duties may be generated. In addition, a waste in costs tends to be generated such as the case where licenses of applications that a user group does not need to use must be even prepared and hardware of the specification necessary for using the applications must also be introduced.

In the above conventional technique, when a failure has occurred to a blade server and a substituting environment is provided to a user, for example, deployment of an application is executed according to a fixed master corresponding to a duty group, etc., to which the user belongs. In this case, the application that the user needs may not be provided in the substituting environment and, therefore, the restrictions and dissatisfaction arise to the user in executing his/her duties.

SUMMARY

The present invention was conceived in view of the above circumstances and principally provides a technique of concurrently establishing both securing of an application use environment desired by a user and effective management of an application deploying master in a thin client system.

According to one aspect of the disclosed system, there is provided a master management system comprising a storage device that has stored therein a first database that has stored therein data on attributes of each of users of a thin client, a list of applications that the user desires to use in a virtual desktop environment provided by an information processing apparatus, and process loads exerted on the information processing apparatus when the applications included in the list are executed, a second database that has stored therein data on permission or rejection of application virtualization of each of the applications, and a third database that has stored therein data on the throughput of the information processing apparatus that provides the virtual desktop environment; a communication apparatus that data-communicates with another apparatus; a duty master creating part that: reads the user attributes and the list from the first database into a memory, to count the number of users desiring to use each of the applications in each group of same-attribute users, identifies the thus counted applications each of which the number of users desiring to use is equal to or larger than a predetermined number, creates a master to deploy the thus identified applications on the information processing apparatus and stores the master as a duty master in the storage device correlating the master with the user groups; and an individual setting part that: reads, into the memory, data on permission or rejection of application virtualization from the second database for the applications each of which the number of users desiring to use is equal to or smaller than the predetermined number to identify virtualization-possible applications allowing virtualization; and accesses, through the communication apparatus, a distribution destination list of a distributing server that executes streaming distribution of the applications to the thin client or the information processing apparatus, to set data on users desiring to use the virtualization-possible applications in the distribution destination list.

The master management system may comprise a data acquiring part that: communicates with a computer that the user currently is using to acquire data on the attributes of the user of the computer, a list of the applications currently used on the computer, and the process load exerted on the computer during execution of the applications included in the list which are collected by a predetermine program of the computer; and stores the data in the first database handling the attributes of the user of the computer as attributes of the user of the thin client, the list of the applications currently used on the computer as a list of applications that are desired to be used in the virtual desktop environment, and the process load on the computer as the process load on the information processing apparatus.

In the master management system, the second database may have stored therein, for each application, data on permission or rejection of application virtualization, and the hardware configuration and a supporting OS that are necessary for execution. The third database may have stored therein data on the hardware configuration of the information processing apparatus as the throughput of the information processing apparatus that provides the virtual desktop environment. The duty master creating part may read the user attributes and the list from the first database into the memory, read data of a supporting operating system for each application from the second database into the memory, count the number of users who desire to use each of the applications of the same supporting operating system in each same-attribute user group, identify the thus counted applications each of which the number of users desiring to use is equal to or larger than the predetermined number, create a master to deploy the thus identified applications on the information processing apparatus, and store the master as a duty master in the storage device correlating the master with the user group. The master management system may comprise a hardware-dependent master creating part that reads the duty master from the storage device into the memory, that reads data on the hardware configuration necessary for executing each of the applications to be deployed by the duty master from the second database, that identifies data of the hardware configuration that has the highest performance over all the applications in the thus read data of the hardware configuration, that identifies the information processing apparatus having the thus identified hardware configuration from the third database, that creates a master to deploy the supporting operating system on the thus identified information processing apparatus, and that stores the master as a hardware-dependent master in the storage device correlating the master with the user group.

In the master management system, the data acquiring part may acquire data on login time zones of the user to the computer and store the data in the first database. The duty master creating part may: read data on the user attributes, the list, and the login time zones from the first database into the memory to count the number of users in each group of the same-attribute users who desire to use each of the applications for each login time zone; identify the thus counted applications each of which the number of users desiring to use is equal to or larger than the predetermined number; create a master to deploy the thus identified applications on the information processing apparatus; and store the master as a duty master in the storage device correlating the master with the user group and the login time zone.

In the master management system, the duty master creating part may read data on the user attributes, the list, and the login time zones from the first database into the memory to count the number of users in each group of the same-attribute users who desire to use each of the applications for each login time zone, execute a process of identifying the thus counted applications each of which the number of users desiring to use is equal to or larger than the predetermined number; identify a login time zone for which the same applications are identifiable for a group of the same-attribute users for different time zones; create a master common to the different login time zones; and store the master as a duty master in the storage device correlating the master with the user group and the login time zone.

In the master management system, the second database may have stored therein data on permission or rejection of application virtualization for each of the applications and the number of remaining licenses of the applications. The master management system may comprise a license increasing/decreasing part that: reads, from the storage device, input screen data that accepts an application for adding or deleting a license of an application from a user of the thin client to transmit the data to the thin client of the user; accepts information on the application whose license is to be added or deleted and information on the number of licenses to be added or deleted, from the thin client through the input screen; and executes a process of increasing or decreasing the number of remaining licenses of the applications based on the information on the number of licenses to be added or deleted.

In the master management system, the third database may have stored therein data on the throughput of the information processing apparatus that provides the virtual desktop environment and the address on the network of the information processing apparatus. The master management system may comprise a deployment executing part that: reads the duty master and the hardware-dependent master for a predetermined user from the storage device into the memory; reads the address of the information processing apparatus allocated to the predetermined user from the third database into the memory; and executes a process of transferring the thus read hardware-dependent master to the address of the information processing apparatus allocated to the predetermined user to deploy the supporting operating system, and a process of transferring the duty master in the memory to the address of the information processing apparatus allocated to the predetermined user to deploy the applications.

In the master management system, the third database may have stored therein data on the throughput of the information processing apparatus that provides the virtual desktop environment and the address on the network of the thin client or the information processing apparatus. The master management system may comprise an individual distribution executing part that transmits, to the distributing server through the communication apparatus, a request for streaming distribution to the information processing apparatus or the thin client of the virtualization-possible applications, in which the request includes data on the attributes of the predetermined user and the address on the network of the information processing apparatus or the thin client allocated to the predetermined user.

In the master management system, the second database may have stored therein data on permission or rejection of application virtualization for each of the applications and the state of customization that the user executes for the applications. The third database may have stored therein data on the throughput of the information processing apparatus that provides the virtual desktop environment and the address on the network of a substitutive apparatus for the information processing apparatus. The master management system may comprise a substitutive application setting part that accepts a substitution request of the virtual desktop environment using an input interface, that reads into the memory the duty master correlated with the user attributes from the storage device based on the attribute data of the predetermined user included in the substitution request, and that applies, to the applications, a process of transferring the thus read duty master to a substitutive apparatus allocated to the predetermined user to deploy the applications and a customizing process of reading the customization state data from the second database for the deployed applications to match the applications with the customization state data; a substitutive individual distribution executing part that reads the address of the substitutive apparatus allocated to the predetermined user from the third database into the memory, and that transmits, to the distributing server through the communication apparatus, a request for streaming distribution to the substitutive apparatus of the virtualization-possible applications, the request including data on the attributes of the predetermined user and the address on the network of the substitutive apparatus allocated to the predetermined user; and a notifying part that notifies the thin client of the predetermined user of the address of the substitutive apparatus.

In the disclosed system, there is provided a master management method implemented by a computer system, the computer system including a storage device that has stored therein a first database that has stored therein data on attributes of each of users of a thin client, a list of applications that the user desires to use in a virtual desktop environment provided by an information processing apparatus, and process loads exerted on the information processing apparatus when the applications included in the list are executed, a second database that has stored therein data on permission or rejection of application virtualization of each of the applications, and a third database that has stored therein data on the throughput of the information processing apparatus that provides the virtual desktop environment; and a communication apparatus that data-communicates with another apparatus. The master management method comprises the steps of reading the user attributes and the list from the first database into a memory, counting the number of users desiring to use each of the applications in each group of same-attribute users, identifying the thus counted applications each of which the number of users desiring to use is equal to or larger than a predetermined number, creating a master to deploy the thus identified applications on the information processing apparatus, and storing the master as a duty master in the storage device correlating the master is with the user groups; and reading, into the memory, data on permission or rejection of application virtualization from the second database for the applications each of which the number of users desiring to use is equal to or smaller than the predetermined number, identifying virtualization-possible applications allowing virtualization, accessing a distribution destination list of a distributing server that executes streaming distribution of the applications to the thin client or the information processing apparatus, and setting data on users desiring to use the virtualization-possible applications in the distribution destination list.

In the disclosed system, there is provided a master management program operable to cause a computer system that includes a storage device that has stored therein a first database that has stored therein data on attributes of each of users of a thin client, a list of applications that the user desires to use in a virtual desktop environment provided by an information processing apparatus, and process loads exerted on the information processing apparatus when the applications included in the list are executed, a second database that has stored therein data on permission or rejection of application virtualization of each of the applications, and a third database that has stored therein data on the throughput of the information processing apparatus that provides the virtual desktop environment; and a communication apparatus that data-communicates with another apparatus, to execute the steps of reading the user attributes and the list from the first database into a memory, counting the number of users desiring to use each of the applications in each group of same-attribute users, identifying the thus counted applications each of which the number of users desiring to use is equal to or larger than a predetermined number, creating a master to deploy the thus identified applications on the information processing apparatus, and storing the master as a duty master in the storage device correlating the master with the user groups; and reading, into the memory, data on permission or rejection of application virtualization from the second database for the applications each of which the number of users desiring to use is equal to or smaller than the predetermined number, identifying virtualization-possible applications allowing virtualization, accessing a distribution destination list of a distributing server that executes streaming distribution of the applications to the thin client or the information processing apparatus, and setting data on users desiring to use the virtualization-possible applications in the distribution destination list.

As the master, for example, an image file of a computer installed with the application (the above information processing apparatus such as a blade server), a file of a kick-start installer that automatically installs the application to the computer and the like may be assumed. An example of a program to create the master is an existing product that has a function of creating back-up data (an image file) by backing up the data in a computer while restoring the back-up data by transferring the back-up data to another computer.

The virtualization of the above application refers to so-called application streaming and is a technique of distributing by streaming an application to a user terminal such as a thin client (or an information processing apparatus such as a blade server) and causing the application to be executed on a cache of the user terminal. When this application streaming technique is applied, dedicated software (for example, a streaming client) is installed in the user terminal. When the software is started up in the user terminal, an application installation image collectively managed by the server is acquired by the user terminal. This installation image can be cached in the user terminal and, even when the distributing server and the user terminal are offline with each other, the application is usable on the user terminal. The installation image is data that includes therein files necessary for installing the application, registry setting information, etc., as a package.

As used herein, "deployment" part a process of preparing a network application, a web service, etc. to be usable, and the "deployment" causes software used externally through a network, a component referred to by another piece of software, etc., to be usable.

The above and other problems and solutions thereto disclosed herein will become apparent from the following description of the preferred embodiments with reference to the accompanying drawings.

The disclosed system enables both securing of an application use environment desired by a user and effective management of an application deploying master to be concurrently established in a thin client system.

These and other benefits are described throughout the present specification. A further understanding of the nature and advantages of the invention may be realized by reference to the remaining portions of the specification and the attached drawings.

BRIEF DESCRIPTION OF THE DRAWINGS

FIGS. 6A and 6B depict exemplary data structures, respectively, of a PC environment management database and an application attribute management database according to the embodiment.

FIGS. 7A and 7B depict exemplary data structures, respectively, of a deployment management database and a master management database according to the embodiment.

FIGS. 8A and 8B depict exemplary data structures, respectively, of distribution destination list and an application database according to the embodiment.

FIG. 13 depicts exemplary selection of objects of master creation according to the embodiment.

FIG. 14 depicts exemplary objects of a deploying process according to the embodiment.

DETAILED DESCRIPTION OF THE EMBODIMENTS

==System Configuration==

Figure 1:
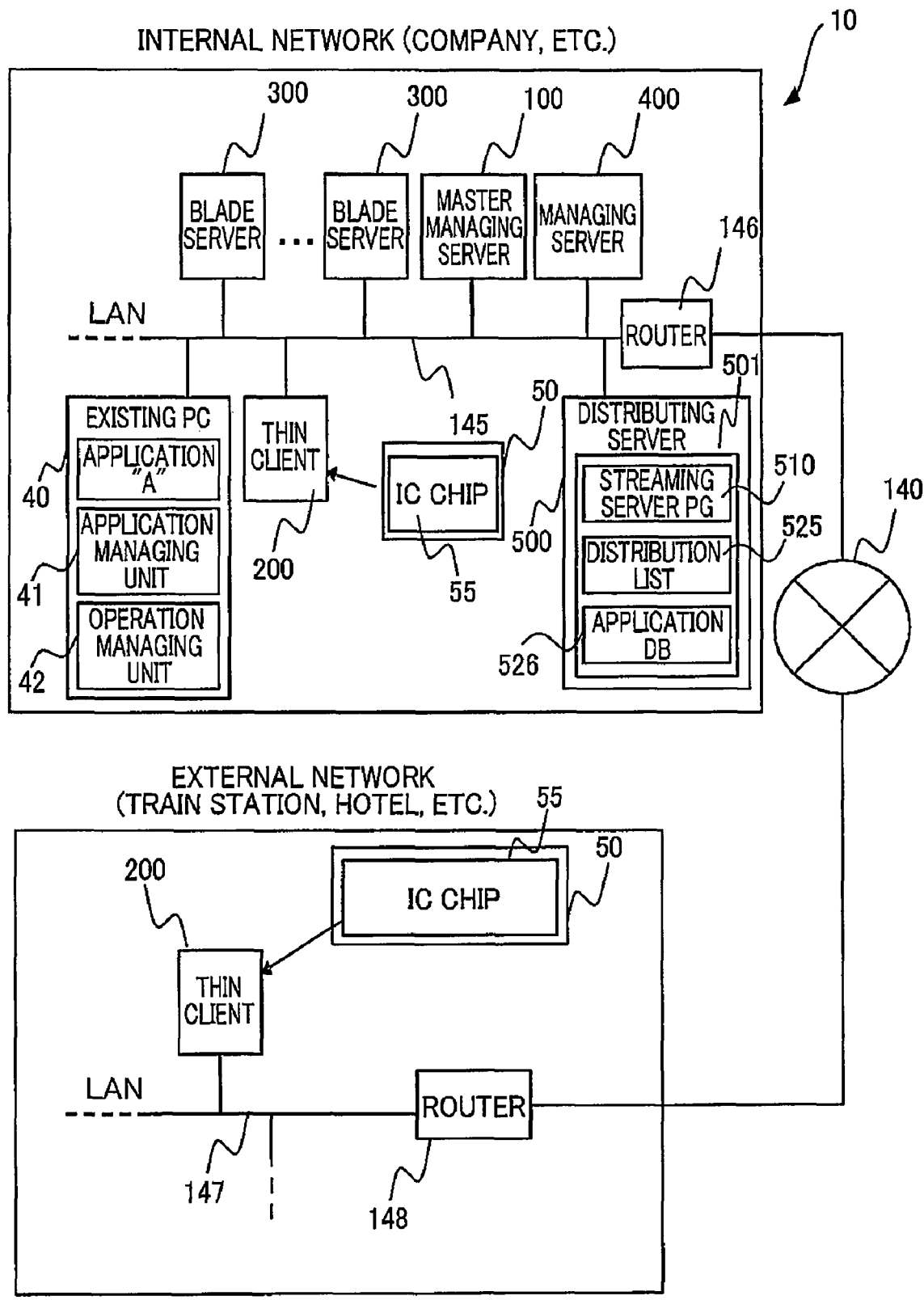
FIG. 1 depicts a network configuration of a thin client system that includes a master management system according to an embodiment of the present invention.

A preferred embodiment of the present invention will be described in detail with reference to the drawings. FIG. 1 depicts the network configuration of a thin client system 10 that includes a master management system 100 of the embodiment. The thin client system 10 shown in FIG. 1 is a system that includes a plurality of blade servers 300 that are information processing apparatuses mutually coupled through a network 140, a managing server 400 that manages the blade servers 300, a thin client 200 that is coupled to the blade server 300 through the network 140, a distributing server 500 that executes streaming is distribution of an application to the thin clients 200 (and the blade server 300), and a master managing server 100 (master management system). Data communication between the thin clients 200 and the blade server 300 may be through the managing server 400, or may not be through the managing server but directly processed between the thin clients 200 and the blade server 300.

The master managing server 100 may be assumed to be at least once coupled to an existing PC 40 through the network 140. The existing PC 40 is, for example, a personal computer including a hard disk that the user uses before the user moved to the thin client 200. In the existing PC 40, data including the configuration of the hardware included in the existing PC 40 (a CPU, a memory, the size and the resolution of a display, etc.), the name of the user using the PC 40, applications installed in the PC 40 and the state of their use, the process load during the use of the applications, etc., is collected by a predetermined program that resides in the existing PC 40 (An existing data collecting program has to only be used for the predetermined program). The predetermined program communicates with a data acquiring part of the master managing server 100 through the existing PC 40 and uploads the collected information about the existing PC 40. An application managing unit 41 that collects information on the applications installed in the existing PC 40, and an operation managing unit 42 that collects information on the configuration of the hardware included in the existing PC 40 (the CPU, the memory, the size and the resolution of the display, etc.), the name of the user using the PC 40, the state of the use of the application s installed (times of login and logoff), the process load during the use of the applications (the load on the CPU, the amount of the memory used, and the CPU load statistics, the memory use amount statistics), are assumed as the predetermined program residing in the existing PC 40.

The master server 100, the thin clients 200, the blade server 300, the managing server 400, the distributing server 500, and the existing PC 40 are coupled to a LAN (Local Area Network) 145 that is an internal network constructed in a company, etc. The LAN 145 is coupled to the network 140 such as a WAN (Wide Area Network), etc., through a router 146. It is assumable for the thin clients 200 that the thin clients 200 are used being coupled not to an internal network (of a company, etc.) but to an external network constructed at a travel destination such as an office in another company, a hotel to stay in during a business trip, a train station, etc. In this case, the thin clients 200 are coupled to a LAN 147 that is an external network and are coupled to the network 140 such as a WAN through a router 148.

The blade server 300 constructs a VPN (Virtual Private Network) between the blade server 300 and the thin clients 200. The blade server 300 receives and processes input information (the content of an operation of an input apparatus) transmitted from the thin clients 200 through the VPN, and transmits to the thin clients 200 video image information showing the processing result (a desktop screen of a displaying apparatus). The blade server 300 is a server apparatus that is usually used without locally coupling any input/output apparatus thereto.

Figure 2:
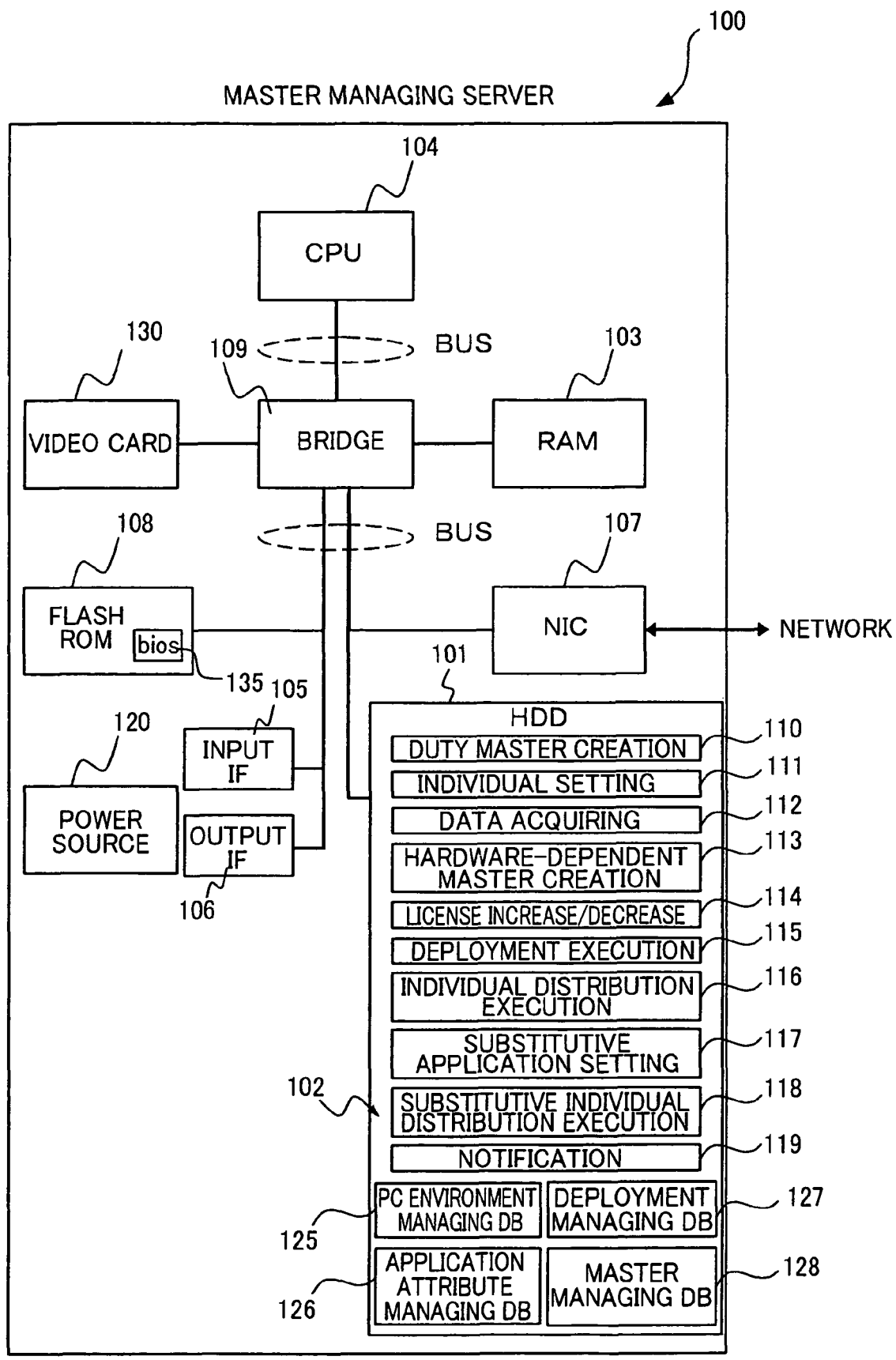
FIG. 2 depicts an exemplary configuration of a master managing server according to the embodiment.

Each apparatus constituting the thin client system 10 that includes the master managing server 100 in the embodiment will be described. FIG. 2 depicts an exemplary configuration of the master managing server 100 of the embodiment. The master managing server 100 reads a program 102 stored in a hard disk drive 101, etc., and stores the program 102 in a RAM 103 to include therein a function of realizing the embodiment, and executes the program 102 using a CPU 104 that is a computing apparatus.

The master managing server 100 includes: an input interface 105 such as various buttons; an output interface 106 such as a display; an NIC (Network Interface Card) 107 that executes transmission and reception of data between the server 100, and the blade server 300, the distributing server 500, the existing PC 40, etc.

The master managing server 100 is coupled by the NIC 107 to the blade server 300, etc., through the network 140 such as the Internet or a LAN, and executes transmission and reception of data. The master managing server 100 includes a flash ROM 108, a video card 130 to output video image data to the display, etc., a bridge 109 that relays a bus that couples the above units 101 to 130, and a power source 120.

The flash ROM 108 has a BIOS 135 stored therein. After the power source 120 is turned on, the CPU 104 first accesses the flash ROM 108 and executes the BIOS 135 and, thereby, recognizes the system configuration of the master managing server 100. The hard disk drive 101 has stored therein an OS 115 in addition to functional parts, tables, and the like. The OS 115 is a program for the CPU 104 to collectively control the units 101 to 120 of the master managing server 100 and execute respective parts described later. According to the BIOS 135, the CPU 104 loads the OS 115 from the hard disk drive 101 to the RAM 103 and executes the OS 115. Thereby, the CPU 104 collectively controls the respective units of the master managing server 100.

Means that the master managing server 100 configures and retains base on, for example, the program 102 will be described. It is assumed that the master managing server 100 has stored therein, in its hard disk drive 101, a PC environment management database 125 that is the first database, an application attribute management database 126 that is a second database, a deployment management database 127 that is a third database, and a master management database 128 having the master stored therein. These databases 125 to 128 may surely not only be retained by the master managing server 100 itself in its hard disk drive 101 but also be disposed being distributed on other server apparatuses disposed on the network 140.

The master managing server 100 includes a duty master creating part 110 that: reads the user attributes and a list from the PC environment management database 125 that is the first database and stores them in the RAM 103; counts the number of users in each group of the same-attribute users who desire to use each application; identifies the thus counted applications each of which the number of users desiring to use is equal to or larger than a predetermined number; creates a master to deploy the thus identified applications, on the blade server 300; and stores the master as a duty master in the master management database 128 correlating the master with the user groups.

For the applications each of which the number of users desiring to use is equal to or smaller than the predetermined number, the master managing server 100 includes an individual setting part 111 that: reads permission/rejection data for virtualization of the applications from the application attribute management database 126 that is the second database and stores the data in the RAM 103; identifies virtualization-possible applications allowing virtualization; accesses, through the NIC 107, a distribution destination list 525 (described later) of the distributing server 500 that executes streaming distribution of the applications to the thin clients 200 or the blade server 300; and sets, in the distribution destination list 525, the data of those who desire to use the virtualization-possible applications.

It is preferable that the master managing server 100 includes a data acquiring part 112 that: communicates with the existing PC 40 that the user uses; acquires the attributes of the user (the user ID, position information, etc.) of the existing PC 40, a list of the applications that are used on the existing PC 40, and data about the process load on the existing PC 40 exerted during execution of the applications included in the list which are collected by the application managing unit 41 and the operation managing unit 42 that reside in the existing PC 40; and, in the PC environment management database, stores the data handling the attributes of the user of the existing PC 40 as attributes of the user of the thin client 200, the list of the applications used on the existing PC 40 as a list of applications that are desired to be used in the virtual desktop environment, and the process load on the existing PC 40 as the process load on the blade server 300.

The data acquiring part 112 may also acquire the data on the time zone for login to the existing PC 40 of the user and store the data in the PC environment management database 125.

In this case, the duty master creating part 110 may: read the user attributes, the list, and data on the login time zone from the PC environment management database 125 and store these pieces of data in the RAM 103; count the number of users who desire to use each application in each same-attribute user group for each login time zone; identify the thus counted applications each of which the number of users desiring to use is equal to or larger than the predetermined number; create a master to deploy the thus identified applications on the blade server 300; and store the master as a duty master in the master management database 128 of a storage device 101 correlating the master with the user group and the login time zone.

The duty master creating part 110 may also: read the user attributes, the list, and the data on the login time zone from the PC environment management database 125 and store the these pieces of data in the RAM 103; count the number of users who desire to use each application in each same-attribute user group for each login time zone; execute a process of identifying the thus counted applications each of which the number of users desiring to use is equal to or larger than the predetermined number; identify login time zones for which the same applications are identified for same-attribute user groups for different login time zones; create a common master among the different login time zones; and store the master as a duty master in the master management database 128 of the storage device 101 correlating the master with the user group and the login time zone.

The application attribute management database 126 may have stored therein data on permission/rejection of application virtualization for each application, the hardware configuration necessary for executing the application, and the OS supporting the applications. The deployment management database 127 may have stored therein data on the hardware configuration of the blade server 300 as the process performance of the blade server 300 that provides the virtual desktop environment.

In this case, the duty master creating part 110 reads the user attributes and the list from the PC environment management database 125 and stores these pieces of data in the RAM 103; reads data of a supporting operating system of each application from the application attribute management database 126 and stores the data in the RAM 103; counts the number of users who desire to use each application of the same supporting operating system in each same-attribute user group; identifies the thus counted applications each of which the number of users desiring to use is equal to or larger than the predetermined number; creates a master to deploy the thus identified applications on the blade server 300; and stores the master as a duty master in the master management database 128 of a storage device 101 correlating the master with the user group.

The master managing server 100 may include a hardware-dependent master creating part 113 that: reads the duty master from the master management database 128 of the storage device 101 and stores the duty master in the RAM 103; reads data on the hardware configuration necessary for executing the applications to be deployed by the duty master from the application attribute management database 126; identifies the data of the hardware configuration that has the highest performance over all the applications in the data of the hardware configuration read at this time; identifies the blade server 300 having the hardware configuration identified at this time from the deployment management database 127; creates a master to deploy the supporting operating system on the blade server 300 identified at this time; and stores the master as a hardware-dependent master in the master management database 128 of the storage device 101 correlating the master with the user group.

The application attribute management database 126 may have stored therein data on permission/rejection of application virtualization of each application and the number of remaining licenses of the applications. In this case, the master managing server 100 may include a license increasing/decreasing part 114 that: reads from the storage device 101 input screen data that receives an application for adding or deleting a license of an application from a user of the thin client 200; transmits the data to the thin client 200 of the user; receives information on the application whose license is to be added or deleted and information on the number of licenses to be added or deleted, from the thin client 200 through the input screen; and executes a process to increase or decrease the number of remaining licenses of the applications based on the information on the number of licenses to be added or deleted.

The deployment management database 128 may have stored therein data on the process capacity of the blade server 300 to be provided with the virtual desktop environment, and the address on the network 140 of the blade server 300. In this case, it is preferable that the master managing server 100 includes a deployment executing part 115 that: reads the duty master and the hardware-dependent master for a predetermined user from the master management database 128 of the storage device 101 and stores these masters in the RAM 103; reads the address of the blade server 300 allocated to the predetermined user from the deployment management database 128 and stores the address in the RAM 103; and executes a process of transferring the hardware dependent master read at this time addressing this master to the address of the blade server 300 allocated to the predetermined user and deploying the supporting operating system, and a process of transferring the duty master in the RAM 103 addressing the master to the address of the blade server 300 allocated to the predetermined user and deploying the applications.

The deployment management database 128 may have stored therein data on the process capacity of the blade server 300 to be provided with the virtual desktop environment, and the address on the network 140 of the thin client 200 or the blade server 300. In this case, it is preferable that the master managing server 100 includes an individual distribution executing part 116 that transmits, to the distributing server 500 through the NIC 107, a request for streaming distribution to the blade server 300 or the thin client 200 of the virtualization-possible applications, including data on the attributes of the predetermined user and the address on the network 140 of the blade server or the thin client 200 allocated to the predetermined user.

The application attribute management database 126 may store therein data on permission/rejection of application virtualization for each application and the state of customization executed by the user to the applications, and the deployment management database 127 may have stored therein data on the process capacity of the blade server 300 to be provided with the virtual desktop environment and the address on the network 140 of a substitutive apparatus for the blade server 300.

In this case, the master managing server 100 may include a substitutive application setting part 117 that: receives a substitution request of the virtual desktop environment using its input interface 105; reads the duty master correlated with the user attributes from the master management database 128 of the storage device 101 based on the attribute data of the predetermined user included in the substitution request, and stores the duty master in the RAM 103; and executes to the applications a process of transferring the duty master read at this time to a substitutive apparatus allocated to the predetermined user and deploying the applications and a customizing process of reading the customization state data from the application attribute management database 126 for the deployed applications and matching the applications with the customization state data.

The master managing server 100 may include a substitutive individual distribution executing part 118 that: reads the address of the substitutive apparatus allocated to the predetermined user from the deployment management database 128 and stores the address in the RAM 103; and transmits, to the distributing server 500 through the NIC 107, a request for streaming distribution to the substitutive apparatus of the virtualization-possible applications, including data on the attributes of the predetermined user and the address on the network 140 of the substitutive apparatus allocated to the predetermined user. In this case, the master managing server 100 includes a notifying part 119 that notifies the thin client 200 of the predetermined user, of the address of the substitutive apparatus. With this process of notifying the thin client 200 of the address of the substitutive apparatus, the thin client 200 is able to acquire the address of the substitutive apparatus and establish a remote desktop coupling to the substitutive apparatus.

Figure 3:
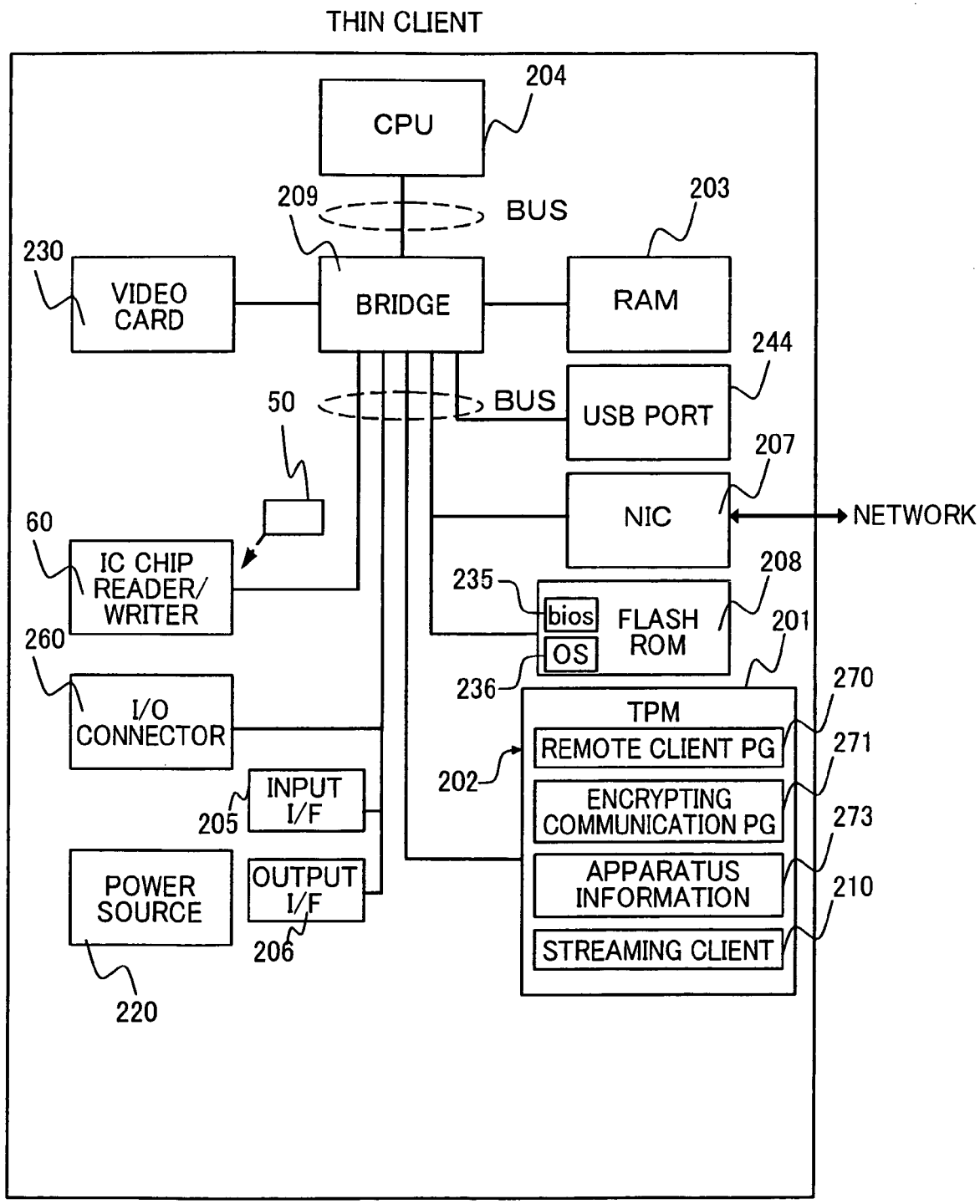
FIG. 3 depicts an exemplary configuration of a thin client according to the embodiment.

FIG. 3 depicts an exemplary configuration of the thin client 200 of the embodiment. The thin client 200 is an apparatus that uses the blade server 300 through the network 140 by a usage allocating process of the managing server 400 and, to include necessary functions as a thin client, the thin client 200 reads a program 202 stored in a TPM 201, stores the program 202 in a RAM 203, and executes the program 202 using a CPU 204.

The thin client 200 includes an input interface 205 such as various keyboards and buttons that are generally included in a computer apparatus, an output interface 206 such as a display, and an NIC 207 that executes transmission and reception of data between the thin client 200 and the blade server 300, the distributing server 500, etc.

The thin client 200 is coupled by the NIC 207 to the blade server 300, the managing server 400, the distributing server 500, etc., through the network 140 such as, for example, the Internet or a LAN, and executes transmission and reception of data.

Although a thin client terminal of so-called HDD-less type is assumed as the thin client 200 in the present embodiment, the thin client 200 is not limited to this, and a terminal formed by converting an existing PC including an ordinary HDD into a thin client may be assumed as the thin client 200. As to this technique of converting an ordinary PC into a thin client terminal, an existing technique may be employed, e.g. coupling a USB memory incorporating an OS to a USB interface of an ordinary PC and executing a series of thin client processes such as starting up the OS, coupling a VPN, and authenticating a managing server (for reference: http://www.hitachi-ics.co.jp/product/seihin/jyourou/sec/sec.html, etc.)

The thin client 200 includes a USB port 244 to couple to various devices, a flash ROM 208, an I/O connector 260 to couple to a keyboard and a mouse, a video card 230 to couple to a display, a bridge 209 to relay a bus that couples to those units 201 to 260, and a power source 220. After the power source 220 is turned on, the CPU 204 accesses the flash ROM 208 and executes a BIOS 235, and thereby recognizes the system configuration of the thin client 200.

An OS 236 in the flash ROM 208 is a program for the CPU 204 to collectively control the units 201 to 260 of the thin client 200 and execute a program that corresponds to each part described later. According to the BIOS 235, the CPU 204 loads the OS 236 from the flash ROM 208 to the RAM 203 and executes the OS 236. An OS that has a relatively small size to be storable in the flash ROM 208 such as a built-in-type OS is used for the OS 236 of the embodiment.

The thin client 200 surely includes, as a thin client terminal, functions of: executing a blade server allocation requesting process to the managing server 400 and a coupling establishing process with the blade server 300, by using certificate information concerning a user, etc., stored in a portable storage medium 50 (USB memory) coupled to the USB port 244, and information on the ID and the password of the user input at the input interface 205.

The thin client 200 also surely includes, as a thin client terminal, functions of: transmitting operation information that is input at the input interface 205 of the thin client 200 being associated with execution of the coupling establishing process with the blade server 300, to the address of the blade server 300; receiving video image information corresponding to the operation information from the blade server 300; and displaying the video image information on the output interface of the thin client 200.

The thin client 200 stores in the TPM 201 a remote client program 270 and an encrypting communication program 271. The remote client program 270 is a program for the thin client 200 to access the desktop of the blade server 300 from a remote location and is, for example, a VNC client (viewer) program. According to the OS 236, the CPU 204 loads the remote client program 270 from the TPM 201 to the RAM 203 and executes the program 270. Thereby the CPU 204 transmits the input information (the content of the operation on the keyboard and the mouse) of the I/O connector 260 to the blade server 300 through the network 140 such as, for example, the VPN, and outputs the video image information (the desktop screen of the display) transmitted from the blade server 300 through the network 140 such as, for example, the VPN to the output interface 206 such as the display coupled to the video card 230.

The encrypting communication program 271 is a communication program to construct a secure communication network such as the VPN with the blade server 300 having the address that is notified of by the remote client program 270. For example, a communication program that uses "IPsec" may be assumed as the program 271. According to the OS 236, the CPU 204 loads the encrypting communication program 271 from the TPM 201 to the RAM 203 and executes the program 271. Thereby the CPU 204 transmits a communication start request to the blade server 300 that is allocated to the own thin client 200 through the NIC 207, constructs a network such as the VPN with the blade server 300, and communicates with the blade server 300 through the VPN, etc.

The thin client 200 in the embodiment has apparatus information 273 stored in the TPM 201. The apparatus information 273 is information for authentication of the thin client 200 included in the coupling establishment request, etc., when the coupling establishment request, etc., are transmitted from the thin client 200. More specifically, for example, the ID, the model number, the MAC address, etc., of the thin client 200 are assumable as the apparatus information.

The TPM 201 has a function similar to that of a security chip mounted on a Smart Card (IC card) and is a hardware chip that has a computing function using asymmetrical keys and a tampering-resistant property to safely retain these keys. The functions of the TPM 201 can be, for example: creation and retention of RSA (Rivest-Shamir-Adleman Scheme) secret keys; computing using the RSA secret keys (signing, encrypting, and decrypting); hashed computing of SHA-1 (Secure Hash Algorithm 1); retention of platform state information (measured values of software) (PCR); keys; certificates; retention of a reliance chain of credentials; creation of high quality random numbers; and a non-volatile memory, in addition to Opt-in, I/O, etc.

The TPM 201 has a function of safely retaining the platform state information (the measured values of the software) in a register PCR (Platform Configuration Registers) in the TPM and notifying of the information, in addition to functions of creating, retaining, and computing of the encrypted keys (asymmetrical keys). According to the latest specification of the TPM, functions of locality, delegation (authority transfer), etc., are added. The TPM 201 should be physically attached to a part (such as a mother board) of a platform.

The thin client 200 may be a terminal that receives, from the distributing server 500, streaming distribution for the applications each of which the number of users desiring to use is equal to or smaller than the predetermined number, being set in the distributing server 500 by the individual setting part 111 of the master managing server 100. The object of the streaming distribution from the distributing server 500 may be, of course, the blade server 300, instead of the thin client 200. In this case, a desktop image of the applications distributed by streaming to the blade server 300 is transferred from the blade server 300 to the thin client 200 (of course, whose coupling to the blade server 300 has been established).

It is assumable that, when the thin client 200 receives the streaming distribution of the applications from the distributing server 500, the thin client 200 has dedicated software (for example, a streaming client 210) in its TPM 201. The streaming client 210 started up in the thin client 200 acquires an installation image of the applications collectively managed by the distributing server 500. The installation image can be cached in the thin client 200 and, even when the distributing server 500 and the thin client 200 are offline with each other, the applications are usable in the thin client 200 The installation image is data that includes therein files necessary for installing the applications, registry setting information, etc., as a package.

The distributing server 500 has a streaming server program 510 to execute the application streaming, a distribution destination list 525, and an application database 526 that has stored therein the applications to be distributed, stored in a proper storing device such as the hard disk drive 501. For the distribution destination list 525, data of those who desire to use the virtualization-possible applications (such as IDs or addresses on the network 140 of the users, and the thin client 200 or the blade server 300) is stored by the individual setting part 111 of the master managing server 100.

The distributing server 500 receives a streaming distribution request from the individual distribution executing part 116 of the master managing server 100 and, in response to this request, executes the streaming distribution of the applications to the thin client 200 (or the blade server 300). The streaming distribution request includes: the IDs of the applications to be distributed; the ID or the address on the network of the thin client to be the distribution destination; the ID of the thin client user, etc.

In the distributing server 500 that receives the streaming distribution request, the streaming server program 510 starts up. The streaming server program 510 searches the application database 526 for the applications to be distributed based on the application IDs included in the distribution request, and identifies the applications. For the thus identified applications, the streaming server program 510 executes the streaming distribution to the address of, for example, the thin client 200 of the user. The streaming server program 510 executes the streaming distribution communicating with the streaming client 210 included in the thin client 200.

Figure 4:
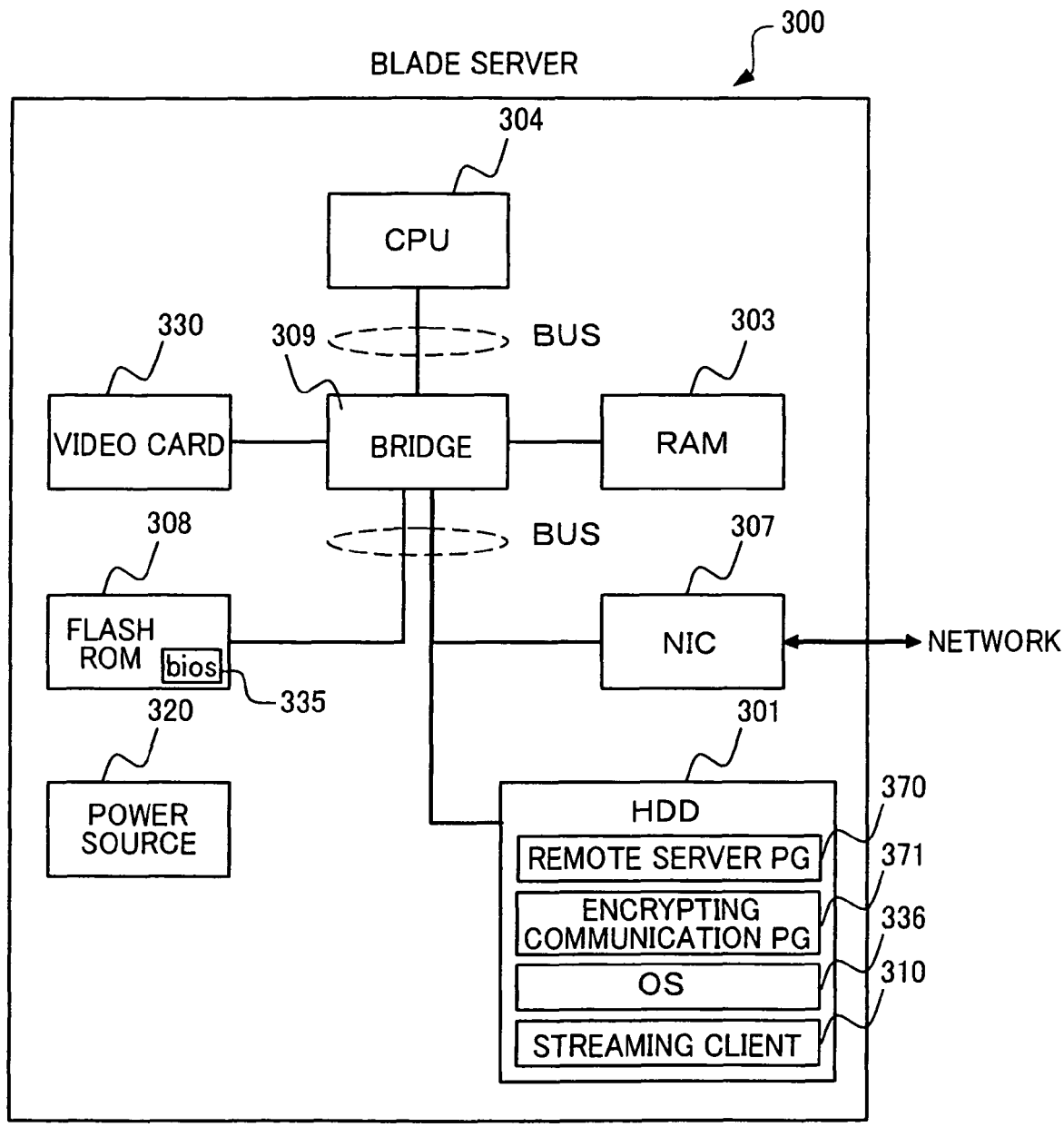
FIG. 4 depicts an exemplary configuration of a blade server according to the embodiment.

FIG. 4 depicts and exemplary configuration of the blade server 300 that is the information processing apparatus of the embodiment. On the other hand, the blade server 300: is an apparatus that accepts use thereof from the thin client 200 through the network by the usage allocating process of the managing server 400; is an apparatus that is the object of the deploying process by the master managing server 100; and reads a program 302 stored in the HDD (Hard Disk Drive) 301, etc., stores the program 302 in the RAM 303, and executes the program using a CPU 304 that is a computing apparatus to include the necessary functions.

The blade server 300 includes an input interface 305 such as various keyboards and buttons that are generally included in a computer apparatus, an output interface 306 such as a display when necessary, and an NIC 307 that executes transmission and reception of data between the blade server 300 and the master managing server 100, the thin client 200, the managing server 400, the distributing server 500, etc.

Using the NIC 307, the blade server 300 is coupled to the master managing server 100, the thin client 200, the managing server 400, the distributing server 500, etc., through the network 140 such as, for example, the Internet or a LAN, and executes transmission and reception of data. In addition, the blade server 300 includes a flash ROM (Read Only Memory) 309, a video card 330 to create video image information of the desktop, a bridge 309 that relays the above units 301 to 330 and a bus, and a power source 320.

The flash ROM 308 has a BIOS (Basic Input/Output System) 335 stored therein. After the power source 320 is turned on, the CPU 304 first accesses the flash ROM 308 and executes the BIOS 335 and, thereby, recognizes the system configuration of the blade server 300.

The blade server 300 has a remote server program 370, an encrypting communication program 371, and an OS (Operating System) 336, stored in the HDD 301. The OS 336 is a program for the CPU 304 to collectively control the units 301 to 330 of the blade server 300 and execute programs that realize the parts such as the parts 310 to 312. According to the BIOS 335, the CPU 304 loads the OS 336 from the HDD 301 to the RAM 303 and executes the OS 336. Thereby, the CPU 304 collectively controls the units 301 to 330 of the blade server 300.

The remote server program 370 is a program to enable remote operations of the desktop of the blade server 300 from the thin client 200 and is, for example, a server program of VNC (Virtual Network Computing) developed by the Cambridge Research Center of AT&T. According to the OS 336, the CPU 304 loads the remote server program 370 from the HDD 301 to the RAM 303 and executes the program 370. Thereby, the CPU 304 receives and processes input information (the content of an operation on the keyboard and the mouse) transmitted from the thin clients 200 through the network such as the VPN, and transmits video image information showing the processing result (a desktop screen of the display) to the thin clients 200 through the network 140 such as the VPN.

The encrypting communication program 371 is a communication program to construct the network 140 such as the VPN with the thin client 200 and is, for a communication program using, for example, IPsec (Security Architecture for the Internet Protocol). According to the OS 336, the CPU 304 loads the encrypting communication program 371 from the HDD 301 to the RAM 303 and executes the program 371. Thereby, according to the coupling establishment request, etc., accepted from the thin client 200 through the NIC 307, the CPU 304 constructs the secure network 140 such as the VPN with the thin client 200 and executes communication with the thin client 200 through the VPN, etc.

For the applications each of which the number of users desiring use is equal to or smaller than the predetermined number, being set in the distributing server 500 by the individual setting part 111 of the master managing server 100, the blade server 300 is able to be an apparatus that receives the streaming distribution from the distributing server 500. The object of the streaming distribution from the distributing server 500 may be, of course, the thin client 200, instead of the blade server 300.

It is assumable that the blade server 300 that receives the streaming distribution of the applications from the distributing server 400 includes dedicated software (for example, a streaming client 310) in its HDD 301. The streaming client 310 started up in the blade server 300 acquires an installation image of the applications collectively controlled by the distributing server 500. The installation image can be cached in the blade server 300 and, even when the distributing server 500 and the blade server 300 are offline with each other, is the applications are usable on the blade server 300. The installation image is data that includes therein files necessary for installing the applications, registry setting information, etc., as a package.

The blade server 300 transfers the desktop image of the applications distributed by streaming from the distributing server 500 to the thin client 200 (whose coupling to the blade server 300 is surely established) of the user.

Figure 5:
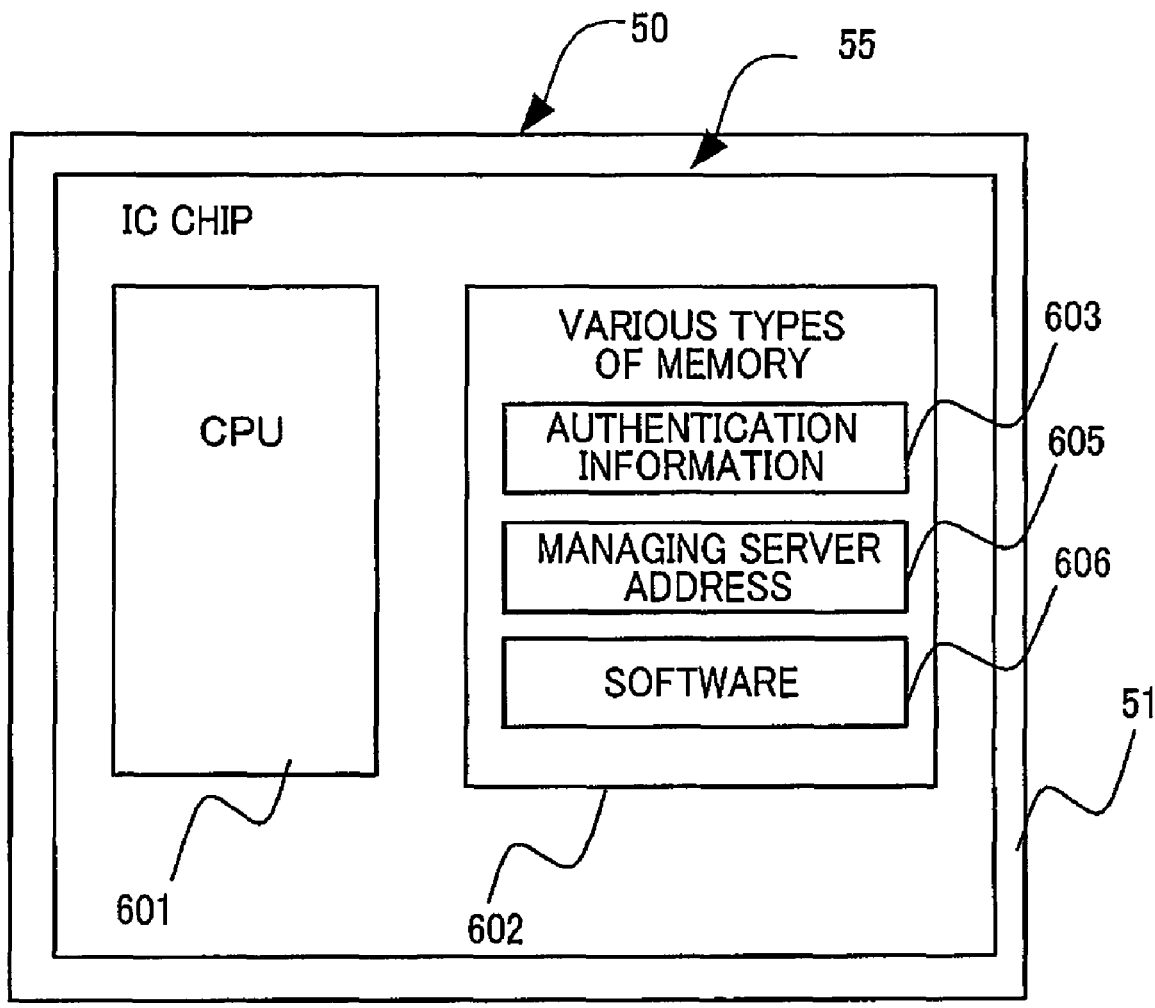
FIG. 5 depicts an exemplary configuration of an IC chip included in a portable staring medium according to the embodiment.

FIG. 5 depicts an exemplary configuration of an IC chip 55 included in the portable storage medium 50 of the embodiment. An example of the portable storage medium 50 can be, for example, a USB device that is formed by housing the IC chip 55 in a proper housing case 51 such as a plastic housing and that is data-communicably coupled to a USB interface of the thin client 200. The IC chip 55 includes a CPU 601 and a memory 602. An authentication device (brand name: KeyMobile) formed by pre-installing personal certificates, secret keys, pass words, and various pieces of application software necessary for mobile-use to a memory card including an IC card unit and a flash memory integrated therein, is able to be employed as the portable storage medium 50. An authentication information 603 that has stored therein the chip ID, the personal certificates, the secret keys, and the passwords; the address 605 of the managing server 400 that executes the usage allocating process between the thin client 200 and the blade server 300; and software 606 (such as an OS and software that executes the personal authenticating process concerning the user of the portable storage medium 50), are assumable as information stored by the portable storage medium 50 in its memory 602.

The managing server 400 has, stored in a proper storage device such as a hard disk, an allocation managing table that stores the correlation between: storage information of the portable storage medium 50 used by the user of each thin client 200; and the address of the blade server 300 that is the usage allocation destination of the thin client 200 tied to the portable storage medium 50. The managing server 400 is an ordinary managing server in the thin client system, that executes the allocating process of the blade server 300 to the thin clients 200, etc., when the coupling establishing process is executed between the thin clients 200 and the blade server 300. Therefore, description is omitted for the functions that the managing server 400 has and the processes executed by the managing server 400 when the coupling between the thin clients 200 and the blade server 300 is established, etc.

The parts 110 to 119 in the master managing server 100 shown so far are may be realized as hardware or may be realized as a program stored in a proper storage device such as a memory or an HDD (Hard Disk Drive). In this case, each of the CPUs reads a corresponding program from the storage device along with the execution of the program, stores the program in the RAM, and executes the program.

As to the network 140, any of various networks may be employed such as an ATM line, a dedicated line, a WAN (Wide Area Network), a home-use power line network, a wireless network, a public line network, and a portable telephone network, in addition to the Internet and a LAN. It is preferable to use a virtual dedicated network technique such as a VPN (Virtual Private Network) when the Internet is employed because communication with enhanced security is established.

==Database Structure==

The database structure used by the master managing server 100 in the embodiment will be described. FIGS. 6A and 6B depict exemplary data structures, respectively, of the PC environment management database 125 and the application attribute management database 126 in the embodiment. The PC environment management database 125 corresponds to the abovementioned first database, and is a database that has stored therein: attributes of each user of the thin client 200; a list of applications that the user desires to use in the virtual desktop environment provided by the blade server; and data on the process load on the blade server during the execution of the applications included in the list. The PC environment management database 125 is an aggregate of records that correlates pieces of data as to the existing PC 40 that the user is using such as: the computer name; CPU information (the quantity, the number of cores, and the frequency); the amount of memory; the size and the resolution of the display; the names of applications installed; the names of applications used by the user; time of the user's login/logoff; and the load on the CPU and the amount of the memory used of the applications used, with each other using, for example, the user ID as a key. It is to be noted that in FIG. 6B each of the terms in the SUPPORTING OS column, "XP", "Vista", and "Server 2003" is a part of a registered trademark or a trademark owned by Microsoft Corporation.

The application attribute management database 126 corresponds to the abovementioned second database, and is a database that has stored therein data on: permission/rejection of application virtualization for each application; the hardware configuration necessary for execution; the corresponding OS; and the number of remaining application licenses. The application attribute management database 126 is an aggregate of records that correlates pieces of data such as: the version of the application; the license cost; the supporting OS (the corresponding OS); permission/rejection of use of a terminal service; permission/rejection of streaming distribution; the necessary CPU performance; the amount of memory occupied; a recommended amount of memory; the file size; and the necessary hard disk area amount, with each other using, for example, the application name as a key.

FIGS. 7A and 7B depict exemplary data structures, respectively, of the deployment management database 127 and the master management database 128. The deployment management database 127 corresponds to the abovementioned third database, and is a database that has stored therein data on the throughput of the blade server 300 that provides the virtual desktop environment. The deployment management database 127 is an aggregate of records that correlates pieces of data such as the model number of the blade server 300, the CPUs (the quantity, the number of cores, and the frequency), the memory, the IP address on the network, the hardware-dependent master, the duty master, and the user ID, with each other using, for example, the ID of the blade server 300 as a key.

The master management database 128 is a database that has stored therein the duty master and the hardware-dependent master created by the master managing server 100. The master management database 128 is an aggregate of records that correlates pieces of data such as the duty master and the hardware-dependent master with each other using, for example, the duty ID (an ID of a duty group to which the user belongs who constitutes a user group) that is a kind of user group information as a key.

FIGS. 8A and 8B depict exemplary data structures, respectively, of the distribution destination list and the application database 526 in the embodiment. The distribution destination list 525 is a database that has stored therein data on the users who desire to use the virtualization-possible applications (the IDs or the addresses on the network 140 of the users and the thin client 200 or the blade server 300, etc.). The application database 526 is a database that has stored therein the applications to be distributed that are distributed from the distributing server 500 to the thin client 200, etc., and that has stored therein the files of the applications correlated by using the application ID as a key.

==First Exemplary Process Flow==

Figure 9:
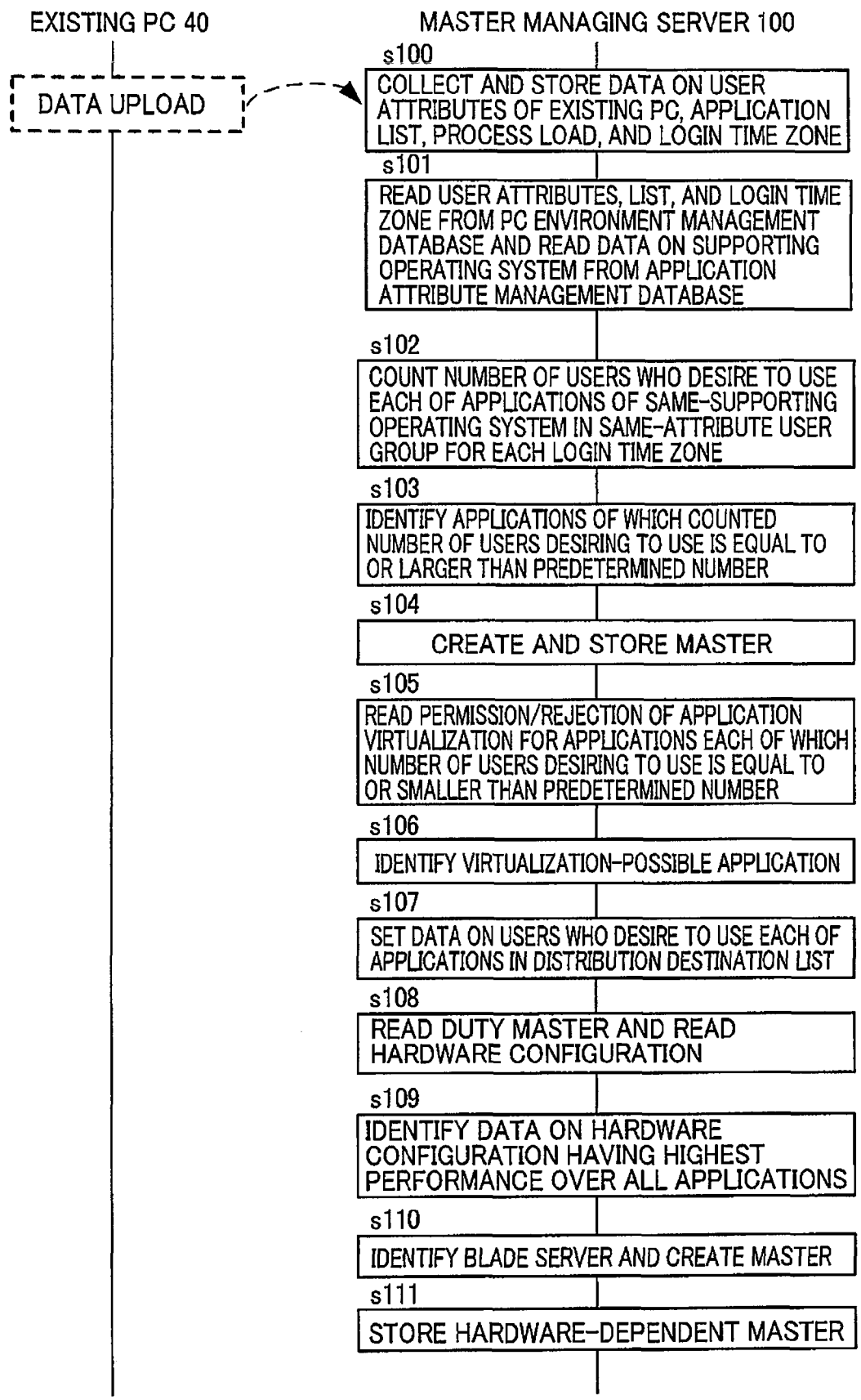
FIG. 9 depicts a first exemplary process flow of a master management method according to the embodiment.

Creating processes of the duty master and the hardware-dependent master by the master managing server 100 will be described. FIG. 9 depicts a first exemplary process flow of a master management method in the embodiment of the present invention. In this case, the data acquiring part 112 of the master managing server 100: communicates with the existing PC 40 currently used by the user through the network 140; acquires the attributes of the user of the existing PC 40 (such as the user ID and position information) collected by the application managing unit 41 and the operation managing unit 42 residing in the existing PC 40, the list of the applications currently used on the existing PC 40, the process load on the existing PC 40 during the execution of the applications included in the list, and data on the login time zone of the user to the existing PC 40; and stores these pieces of data in the PC environment management database 125 (s100).

Then, the duty master creating part 110 of the master managing server 100: reads the user attributes, the list, and the login time zone from the PC environment management database; stores them in the RAM 103; reads data on the supporting operating system for each application from the application attribute management database 126; and stores the data in the RAM 103 (s101).

For the data stored in the RAM 103, the duty master creating part 110 counts the number of users who desire to use each application for the same supporting operating system in each group of the same-attribute users such as a duty group or a group of users working at same positions for, for example, each login time zone (s102). Applications are identified each of which the number of users desiring to use counted at this step is equal to or larger than the predetermined number (s103).

A specific flow is assumable as an example of the process of identifying the applications (see FIG. 13) such as: selection of applications each of which the number of users desiring to use is equal to or larger than a predetermined number "a" (for example, a=8) (first stage); when the number of applications remaining after the selection in the first stage is equal to or smaller than a predetermined number "b" (the number of masters admitted; for example, b=2), the number of users is counted who are common to the applications each of which the number of users desiring to use is equal to or larger than "c" (for example, c=4) and the applications for which the number of users who are common thereto is the smallest are added for creating masters therefor (second stage); the amount of storage necessary for the masters is calculated from the total of the file sizes (the application attribute management database 126), whether this calculated value does not exceed a predetermined storage amount "d" (MB), predetermined ranges of the parameters a to d are varied by returning the process to the first stage when the calculated value exceeds the predetermined storage amount (third stage); and the number of users who do not use the applications selected as the masters in and before the third stage is counted when the calculated value does not exceed the predetermined storage amount in the third stage, the counted user number is multiplied by the unit cost (for example, the license fee for one user), the predetermined ranges of the parameters a to d are varied by returning the process to the first stage when the value acquired by the multiplication is equal to or larger than "a" (fourth stage); when the value acquired by the multiplication is equal to or smaller than a predetermined value "e", masters are created for the applications selected as the masters (fifth stage). When the duty master and the hardware-dependent master are created, restrictions may be imposed such as minimizing of the number of masters, minimizing of the cost such as the license fee, and minimizing of the storage amount to store the masters.

It is to be noted that in FIG. 13 each of the terms, "XP", "Vista", and "Server 2003" is a part of a registered trademark or a trademark owned by Microsoft Corporation.

The duty master creating part 110 creates a master to deploy the applications selected at step s102 on the blade server 300, and stores the master in the master management database 128 of the storage device 101 as the duty master correlating the master with the duty ID and the login time zone of the user groups (s104).

The duty master creating part 110 may also identify the login time zone for which the same applications are identifiable for same-attribute user groups for different login time zones, create a master common to the different time zones, and store this master in the master management database 128 of the storage device 101 as the duty master correlating this master with the user groups and the login time zones.

Then, for the applications each of which the number of users desiring to use is equal to or smaller than the predetermined number, the individual setting part 111 of the master managing server 100 reads permission/rejection data of the application virtualization from the application attribute management database 126 and stores the data in the RAM 103 (s105). The individual setting part 111 selects the virtualization-possible applications allowing virtualization according to the data stored in the RAM 103 (s106). The individual setting part 111 communicates with the distributing server 500 through the NIC 107, accesses the distribution destination list 525 included in the distributing server 500, and sets the data (such as the user IDs) of the users who desire to use the virtualization-possible applications (s107).

The hardware-dependent master creating part 113 of the master managing server 100 reads duty master from the master management database 128 of the storage device 101, stores the duty master in the RAM 103, reads the data of the hardware configuration necessary for executing each application deployed by the duty master (for example, the frequency of the CPU and a recommended memory amount) from the application attribute management database 126 (s108). It is assumed that the data includes, for example, "500 MHz" as the CPU frequency and "512 MB" as a recommended memory amount necessary for executing an application "A"; "700 MHz" as the CPU frequency and "512 MB" as a recommended memory amount necessary for executing an application "B"; and "1 GHz" as the CPU frequency and "512 MB" as a recommended memory amount necessary for executing an application "D".

The hardware-dependent master creating part 113 identifies data of the hardware configuration that has the highest performance over those of all the applications of the pieces of hardware configuration data read in this process (s109) In the above example, the hardware configuration having the highest performance over those of the applications A, B, and D is that with the CPU frequency of "1 GHz" and the recommended memory amount of "512 MB". It is assumable that exemplary selection criteria of the hardware configuration are the one having the highest specification for the CPU, the one having the largest capacity for the recommended memory amount (however, the total of the occupying memory amounts is employed when the total is larger than the above capacity), the total of the necessary disk sizes for the disk size, and provision by a net boot of the applications that are unusable on the terminal server.

The hardware-dependent master creating part 113 identifies the blade server 300 that has the hardware configuration identified at step s109, the CUP frequency of "1 GHz", and the recommended memory amount of "512 MB" from the deployment management database 127, and creates a master to deploy the supporting operating system on the blade server 300 identified at this time (s110). The hardware-dependent master creating part 113 stores this master in the master management database 128 of the storage device 101 as a hardware-dependent master correlating this master with the duty ID indicating the user group (s111). In this manner, the duty master and the hardware-dependent master are created.

==Second Exemplary Process Flow==

Figure 10:
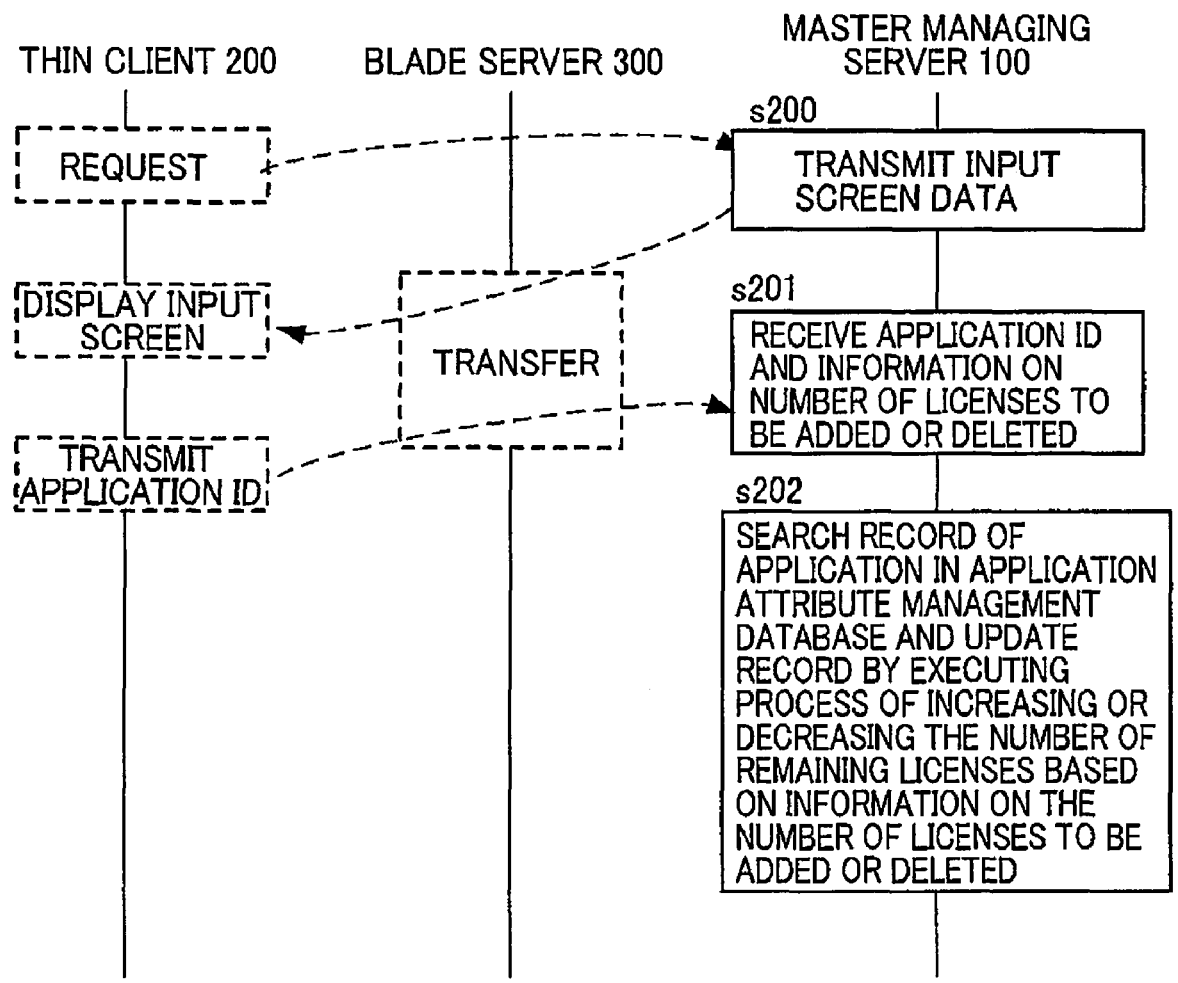
FIG. 10 depicts a second exemplary process flow of the master management method according to the embodiment.

A manner of managing the number of application licenses will be described. FIG. 10 depicts a second exemplary process flow of the master management method in the embodiment. In this case, the license increasing/decreasing part 114 of the master managing server 100: receives a request from, for example, the thin client 200; reads from the storage device 101 the input screen data that receives an application for adding or deleting a license of an application from a user of the thin client 200; and transmits the data to, for example, the thin client 200 of the user through the blade server 300 (s200). The part 114 receives information on the ID of the application whose license is to be added or deleted and the number of licenses to be added or deleted, through the thin client 200 that displays the input screen data transferred from the blade server 300 (s201). The license increasing/decreasing part 114 searches for the record of the application in the application attribute management database 126 based on the application ID and updates the record by executing a process of increasing or decreasing the number of remaining licenses in the searched record based on the information on the number of licenses to be added or deleted (s202).

==Third Exemplary Process Flow==

Figure 11:
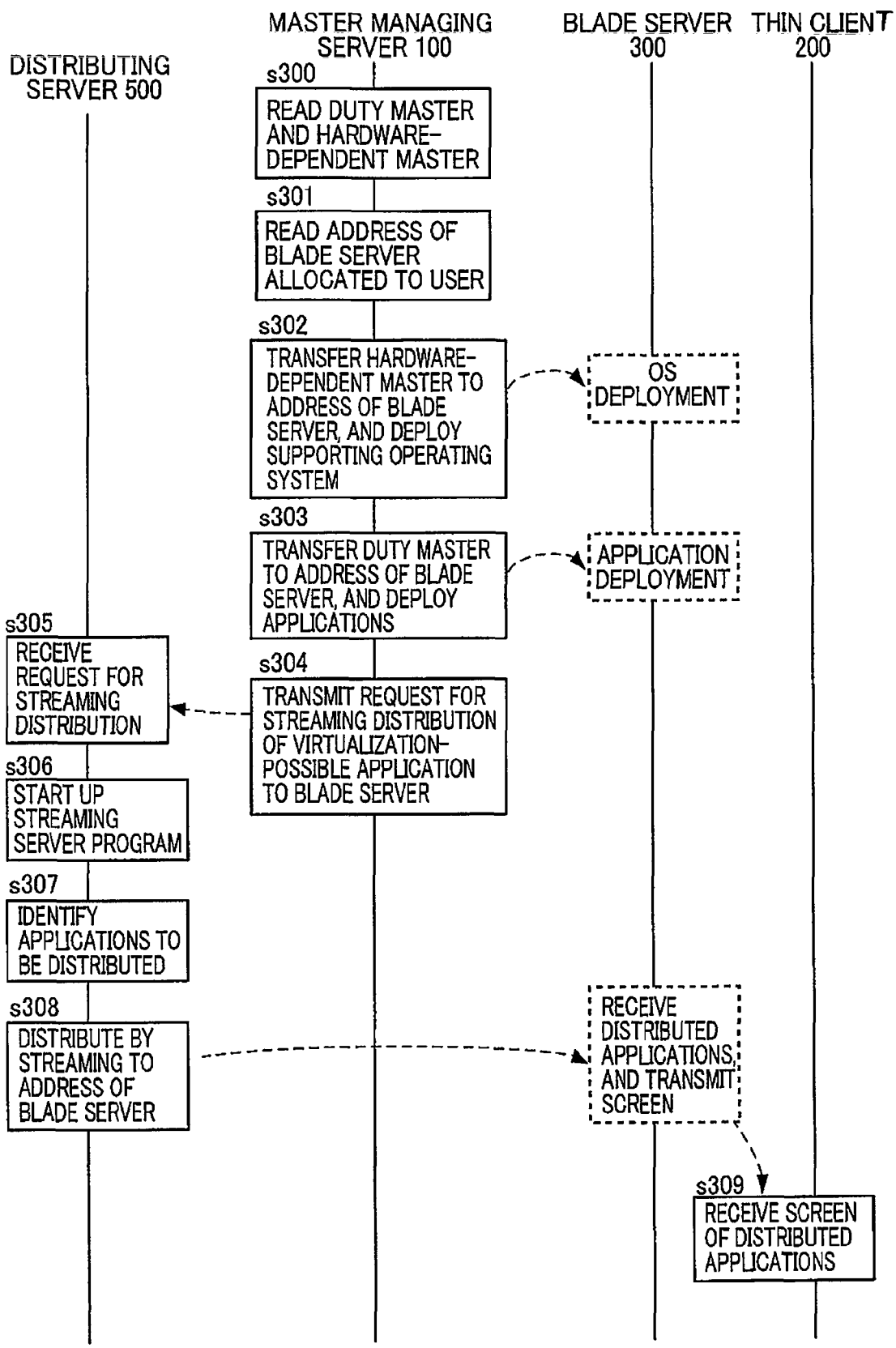
FIG. 11 depicts a third exemplary process flow of the master management method according to the embodiment.

An automatic deployment process based on the duty master and the hardware-dependent master will be described. FIG. 11 depicts a third exemplary process flow of the master management method in the embodiment. The objects of the deployment process into which the duty master and the hardware-dependent master are poured can be, as shown in FIG. 14, the virtual PC or the terminal server realized on a blade PC, a virtual PC or a terminal server realized on a hyper-visor VMM (Virtual Machine Monitor) of the blade server, and a terminal server provided by the blade server. Whether these apparatuses that are the objects of the deployment process each are local and each include storage such as a hard disk drive, or each use an external storage through a network such as an iSCSI and a fiber channel does not matter. It is to be noted that in FIG. 14 the term, "vPro" is a part of a trademark owned by Intel Corporation.

The deployment executing part 115 of the master managing server 100 reads the duty master and the hardware-dependent master for (the duty group including) the predetermined user from the master management database 128 of the storage device 101 and stores the masters in the RAM 103 (s300). The deployment executing part 115 reads the address of the blade server 300 allocated to the predetermined user from the deployment management database 127 and stores the address in the RAM 103 (s301).

The deployment executing part 116 transfers the hardware-dependent master read at step s300 to the address of the blade server 300 read at step s301, and executes a process of deploying the supporting operating system (s302). The deployment executing part 115 transfers the duty master in the RAM 103 to the address of the blade server 300 to execute a process of deploying the application (s303).

On the other hand, the individual distribution executing part 116 of the master managing server 100 transmits a request for streaming distribution to the blade server 300 of the virtualization-possible applications, including the attributes of the predetermined user, data on the address on the network 140 of the blade server 300 allocated to the predetermined user (in this case, the object of the distribution is the blade server 300), and the IDs of the applications to be distributed, to the distributing server 500 through the NIC 107 (s304).

The distributing server 500 receives the streaming distribution request from the individual distribution executing part 116 of the master managing server 100 (s305). The distributing server 500 that receives the streaming distribution request starts up the streaming server program 510 (s306). The streaming server program 510 searches for the applications to be distributed in the application database 526 based on the application IDs included in the distribution request, and identifies the applications (s307).

For the applications identified at step s307, the streaming server program 510 executes streaming distribution to, for example, the address of the blade server 300 (s308). In this case, the desktop image of the applications distributed by streaming to the blade server 300 is transferred from the blade server 300 to the thin client 200 (of course, whose communication with the blade server 300 has been established) (s309).

It is assumable that the above deploying process is executed with its timing matched with the login time zone of the user (data stored in the PC environment management database 125). That is, the master managing server 100 detects the previous time zone of a login time zone (that is, for example, stored in the storage device 101 as "five minutes before the login time zone", etc.) using its clock function, etc., and starts the above deploying process (s300 to s304) along with the detection.

==Fourth Exemplary Process Flow==

Figure 12:
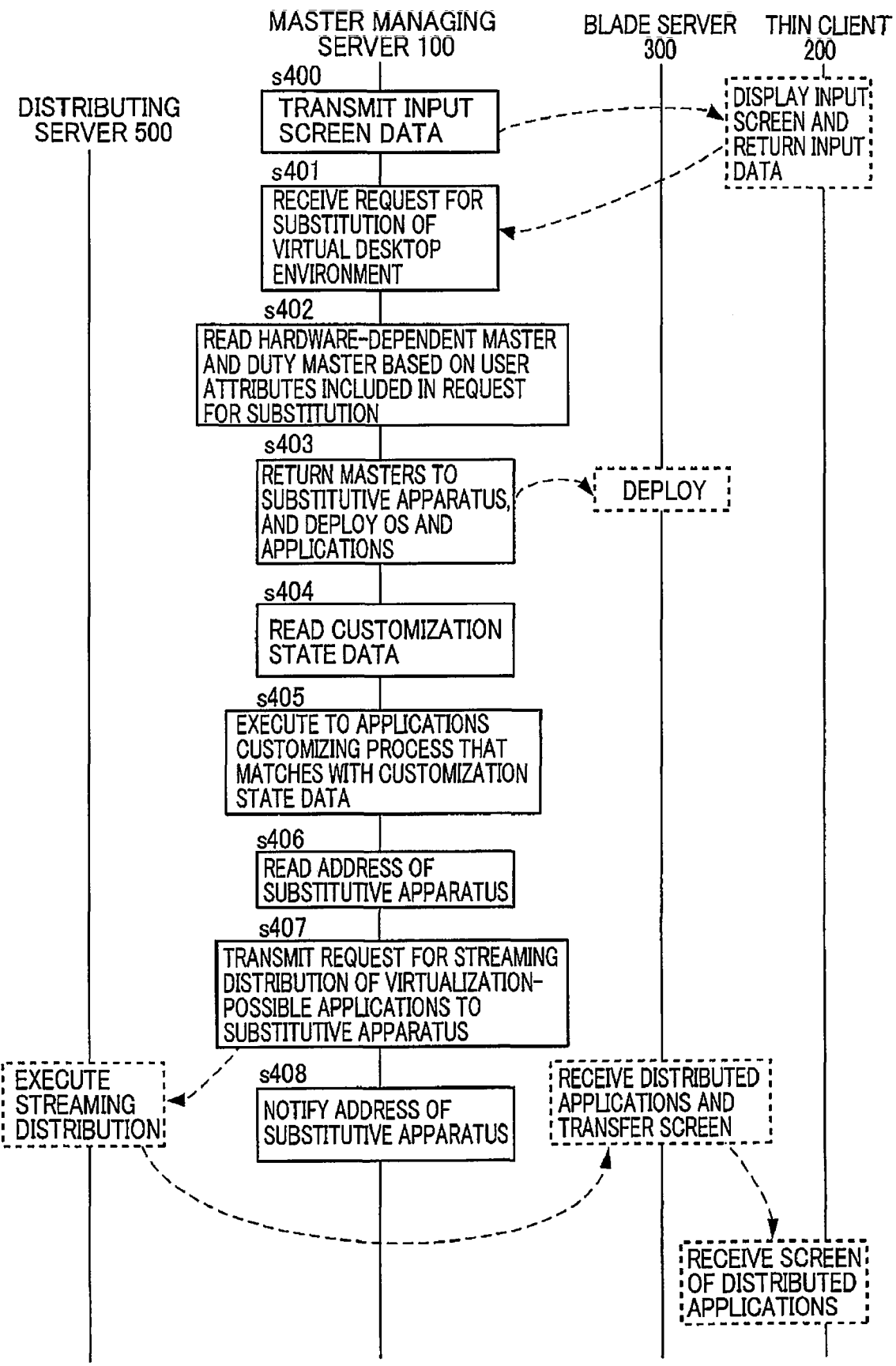
FIG. 12 depicts a fourth exemplary process flow of the master management method according to the embodiment.

Next, it will be assumed that a failure occurs to the blade server 300 and a user using the server 300 issues a request for a substitutive apparatus for the server 300. FIG. 12 depicts a fourth exemplary process flow of the master management method in the embodiment. In this case, the substitutive application setting part 117, for example, transmits input screen data to the thin client 200 of the user (s400). The thin client 200 receives the input screen data and displays an input screen (=input interface) on the display, through which the substitution request for the virtual desktop environment is accepted (s401).

The substitutive application setting part 117 reads the hardware-dependent master and the duty master that are correlated with the user attributes from the master management database 128 of the storage device 101 based on the attribute data of a predetermined user included in the substitution request (for example, the user ID and the duty ID) and stores the masters in the RAM 103 (s402). The substitutive application setting part 117 transfers the hardware-dependent master and the duty master to a substitutive apparatus (substituting blade server) allocated to the predetermined user and deploys the supporting OS and the applications (s403).

For the applications deployed at step s403, the substitutive application setting part 117 reads customization state data (for example, favorites in a web browser, the size and the font of characters displayed on a word processor, the address book and the filtering criteria in a mailer) from the application attribute management database 126 (s404) and executes a customizing process that corresponds to the customization state data to the applications (s405).

The substitutive individual distribution executing part 118 reads the address of the substitutive apparatus allocated to the predetermined user from the deployment management database 128 and stores the address in the RAM 103 (s406). The substitutive individual distribution executing part 118 transmits a request for distribution by streaming to the substitutive apparatus of the virtualization-possible applications, including data on the attributes of the predetermined user and the address on the network 140 of the substitutive apparatus allocated to the predetermined user, to the distributing server 500 through the NIC 107 (s407). In this case, the notifying part 119 of the master managing server 100 notifies thin client 200 of the predetermined user of the address of the substitutive apparatus (s408). With this notifying process for the substitutive apparatus address to the thin client 200, the thin client 200 is able to acquire the address of the substitutive apparatus and establish a remote desktop coupling with the substitutive apparatus.

Other Examples

It is noted that the master managing server 100 may also: regularly monitor the use state of the applications for each user (for example, the number of times of execution for a specific time period, the length of execution time per execution, and the interval of execution) by, for example, monitoring the application execution history in the blade server 300; compare data of the use state acquired as the result of the monitoring with a predetermined frequency stored in the storage device 101; and detect applications whose use state includes a frequency equal to or smaller than the predetermined frequency. In this case, a use stoppage warning (message data is stored in the storage device 101) for the applications that are used only for the predetermined frequency or less may be notified of to the terminal of the user who is the user of the blade server 300 (for example, a portable terminal, etc., of the user, whose address is registered in the storage device 101). Otherwise, the master managing server 100 may execute a process of decreasing the number of remaining licenses for the applications that are used only for the predetermined frequency or less, in the deployment management database 127.

According to the embodiment, in the thin client system, by securely providing the applications desired by each user through the master or through the application streaming, the application use environment desired by the user can be secured and, by suppressing the number of applications registered in a master and the number of masters according to the predetermined criteria, reduction of storage areas of the masters to be deployed and the managing cost is facilitated and, thereby, efficient management of the masters to be deployed is realized. In addition, when a failure occurs to the blade server and a substituting environment is provided to the user, the applications needed by the user are able to be securely provided in a substituting environment and, therefore, no restrictions and dissatisfaction arise to the user in executing his/her duties even during the occurrence of the failure. The collective management of the applications on the center side is realizable without leaving the installation of the applications into the blade server, etc., to each individual user. As to the licenses of the applications, the cost can be limited to the cost for only the licenses for the users who actually need the applications without fixedly determining the necessary number based on the duty or the position.

As above, the embodiments of the present invention have been specifically described based on the embodiments. However, the embodiments of the present invention are not limited to the above and are variously changeable without departing from the scope of the present invention.

The specification and drawings are, accordingly, to be regarded in an illustrative rather than a restrictive sense. It will, however, be evident that various modifications and changes may be made thereto without departing from the spirit and scope of the invention as set forth in the claims.

What is claimed is:

1. A master management system comprising:
   a storage device that has stored therein
      a first database that has stored therein data on attributes of each of users of a thin client, a list of applications that the user desires to use in a virtual desktop environment provided by an information processing apparatus, and a process load exerted on the information processing apparatus when the applications included in the list are executed,
      a second database that has stored therein data on permission or rejection of application virtualization of each of the applications, and
      a third database that has stored therein data on a throughput of the information processing apparatus that provides the virtual desktop environment;
   a communication apparatus that data-communicates with another apparatus;
   a duty master creating part that reads the user attributes and the list from the first database into a memory to count the number of users desiring to use each of the applications in each group of same-attribute users, identifies the thus counted applications each of which the number of users desiring to use is equal to or larger than a predetermined number, creates a master to deploy the thus identified applications on the information processing apparatus, and stores the master as a duty master in the storage device correlating the master with the user groups; and
   an individual setting part that reads, into the memory, data on permission or rejection of application virtualization from the second database for the applications each of which the number of users desiring to use is equal to or smaller than the predetermined number to identify virtualization-possible applications allowing virtualization; and accesses, through the communication apparatus, a distribution destination list of a distributing server that executes streaming distribution of the applications to the thin client or the information processing apparatus, to set data on users desiring to use the virtualization-possible applications in the distribution destination list.

2. The master management system of claim 1, comprising:
   a data acquiring part that communicates with a computer that the user is currently using to acquire data on the attributes of the user of the computer, a list of the applications currently used on the computer, and the process load exerted on the computer during execution of the applications included in the list which are collected by a predetermine program of the computer; and stores the data in the first database handling the attributes of the user of the computer as attributes of the user of the thin client, the list of the applications currently used on the computer as a list of applications that are desired to be used in the virtual desktop environment, and the process load on the computer as the process load on the information processing apparatus.

3. The master management system of claim 2, wherein
   the second database has stored therein, for each application, data on permission or rejection of application virtualization, and the hardware configuration and a supporting OS that are necessary for execution, wherein
   the third database has stored therein data on the hardware configuration of the information processing apparatus as the throughput of the information processing apparatus that provides the virtual desktop environment, and wherein
   the duty master creating part reads the user attributes and the list from the first database into the memory, the duty master creating part reading data of a supporting operating system for each application from the second database into the memory, the duty master creating part counting the number of users who desire to use each of the applications of the same supporting operating system in each same-attribute user group, the duty master creating part identifying the thus counted applications each of which the number of users desiring to use is equal to or larger than the predetermined number, the duty master creating part creating a master to deploy the thus identified applications on the information processing apparatus, the duty master creating part storing the master as a duty master in the storage device correlating the master with the user group,
   the master management system comprising:
   a hardware-dependent master creating part that reads the duty master from the storage device into the memory, that reads data on the hardware configuration necessary for executing each of the applications to be deployed by the duty master from the second database, that identifies data of the hardware configuration that has the highest performance over all the applications in the thus read data of the hardware configuration, that identifies the information processing apparatus having the thus identified hardware configuration from the third database, that creates a master to deploy the supporting operating system on the thus identified information processing apparatus, and that stores the master as a hardware-dependent master in the storage device correlating the master with the user group.

4. The master management system of claim 2, wherein
   the data acquiring part acquires data on login time zones of the user to the computer and stores the data in the first database, and wherein
   the duty master creating part reads data on the user attributes, the list, and the login time zones from the first database into the memory to count the number of users in each group of the same-attribute users who desire to use each of the applications for each login time zone; identifies the thus counted applications each of which the number of users desiring to use is equal to or larger than the predetermined number; creates a master to deploy the thus identified applications on the information processing apparatus; and stores the master as a duty master in the storage device correlating the master with the user group and the login time zone.

5. The master management system of claim 4, wherein the duty master creating part reads data on the user attributes, the list, and the login time zones from the first database into the memory to count the number of users in each group of the same-attribute users who desire to use each of the applications for each login time zone; executes a process of identifying the thus counted applications each of which the number of users desiring to use is equal to or larger than the predetermined number; identifies a login time zone for which the same applications are identifiable for a group of the same-attribute users for different time zones; and creates a master common to the different login time zones, the duty master creating part storing the master as a duty master in the storage device correlating the master with the user group and the login time zone.

6. The master management system of claim 1, wherein the second database has stored therein data on permission or rejection of application virtualization for each of the applications and the number of remaining licenses of the applications,
the master management system comprising:
a license increasing/decreasing part that reads, from the storage device, input screen data that accepts an application for adding or deleting a license of an application from a user of the thin client to transmit the data to the thin client of the user; accepts information on the application whose license is to be added or deleted and information on the number of licenses to be added or deleted, from the thin client through the input screen; and executes a process of increasing or decreasing the number of remaining licenses of the applications based on the information on the number of licenses to be added or deleted.

7. The master management system of claim 1, wherein the third database has stored therein data on the throughput of the information processing apparatus that provides the virtual desktop environment and the address on the network of the information processing apparatus,
the master management system comprising:
a deployment executing part that reads the duty master and the hardware-dependent master for a predetermined user from the storage device into the memory; reads the address of the information processing apparatus allocated to the predetermined user from the third database into the memory, and executes a process of transferring the thus read hardware-dependent master to the address of the information processing apparatus allocated to the predetermined user to deploy the supporting operating system, and a process of transferring the duty master in the memory to the address of the information processing apparatus allocated to the predetermined user to deploy the applications.

8. The master management system of claim 7, wherein the third database has stored therein data on the throughput of the information processing apparatus that provides the virtual desktop environment and the address on the network of the thin client or the information processing apparatus,
the master management system comprising:
an individual distribution executing part that transmits, to the distributing server through the communication apparatus, a request for streaming distribution to the information processing apparatus or the thin client of the virtualization-possible applications, the request including data on the attributes of the predetermined user and the address on the network of the information processing apparatus or the thin client allocated to the predetermined user.

9. The master management system of claim 1, wherein the second database has stored therein data on permission or rejection of application virtualization for each of the applications and the state of customization that the user executes for the applications, and wherein
the third database has stored therein data on the throughput of the information processing apparatus that provides the virtual desktop environment and the address on the network of a substitutive apparatus for the information processing apparatus,
the master management system comprising:
a substitutive application setting part that accepts a substitution request of the virtual desktop environment using an input interface, the substitutive application setting part reading into the memory the duty master correlated with the user attributes from the storage device based on the attribute data of the predetermined user included in the substitution request, the substitutive application setting part applying, to the applications, a process of transferring the thus read duty master to a substitutive apparatus allocated to the predetermined user to deploy the applications and a customizing process of reading the customization state data from the second database for the deployed applications to match the applications with the customization state data;
a substitutive individual distribution executing part that reads the address of the substitutive apparatus allocated to the predetermined user from the third database into the memory, the substitutive individual distribution executing part transmitting, to the distributing server through the communication apparatus, a request for streaming distribution to the substitutive apparatus of the virtualization-possible applications, the request including data on the attributes of the predetermined user and the address on the network of the substitutive apparatus allocated to the predetermined user; and
a notifying part that notifies the thin client of the predetermined user of the address of the substitutive apparatus.

10. A master management method implemented by a computer system, the computer system including:
a storage device that has stored therein
a first database that has stored therein data on attributes of each of users of a thin client, a list of applications that the user desires to use in a virtual desktop environment provided by an information processing apparatus, and process loads exerted on the information processing apparatus when the applications included in the list are executed,
a second database that has stored therein data on permission or rejection of application virtualization of each of the applications, and
a third database that has stored therein data on the throughput of the information processing apparatus that provides the virtual desktop environment; and
a communication apparatus that data-communicates with another apparatus;

the master management method comprising the steps of:

reading, in the computer system, the user attributes and the list from the first database into a memory, counting the number of users desiring to use each of the applications in each group of same-attribute users, identifying the thus counted applications each of which the number of users desiring to use is equal to or larger than a predetermined number, creating a master to deploy the thus identified applications on the information processing apparatus, and storing the master as a duty master in the storage device correlating the master with the user groups; and reading in the computer system, into the memory, data on permission or rejection of application virtualization from the second database for the applications each of which the number of users desiring to use is equal to or smaller than the predetermined number, identifying virtualization-possible applications allowing virtualization, accessing a distribution destination list of a distributing server that executes streaming distribution of the applications to the thin client or the information processing apparatus, and setting data on users desiring to use the virtualization-possible applications in the distribution destination list.

11. A master management program operable to cause a computer system including a storage device that has stored therein a first database that has stored therein data on attributes of each of users of a thin client, a list of applications that the user desires to use in a virtual desktop environment provided by an information processing apparatus, and process loads exerted on the information processing apparatus when the applications included in the list are executed, a second database that has stored therein data on permission or rejection of application virtualization of each of the applications, and a third database that has stored therein data on the throughput of the information processing apparatus that provides the virtual desktop environment; and a communication apparatus that data-communicates with another apparatus, to execute the steps of:

reading the user attributes and the list from the first database into a memory, counting the number of users desiring to use each of the applications in each group of same-attribute users, identifying the thus counted applications each of which the number of users desiring to use in equal to or larger than a predetermined number, creating a master to deploy the thus identified applications on the information processing apparatus, and storing the master as a duty master in the storage device correlating the master with the user groups; and reading, into the memory, data on permission or rejection of application virtualization from the second database for the applications each of which the number of users desiring to use is equal to or smaller than the predetermined number, identifying virtualization-possible applications allowing virtualization, accessing a distribution destination list of a distributing server that executes streaming distribution of the applications to the thin client or the information processing apparatus, and setting data on users desiring to use the virtualization-possible applications in the distribution destination list.

* * * * *